US009786926B2

(12) United States Patent
Lockett et al.

(10) Patent No.: US 9,786,926 B2
(45) Date of Patent: Oct. 10, 2017

(54) PRINTED SILVER OXIDE BATTERIES

(71) Applicant: Printed Energy Pty Ltd, Tempe, AZ (US)

(72) Inventors: Vera Lockett, Phoenix, AZ (US); John Gustafson, Chandler, AZ (US); William Johnstone Ray, Fountain Hills, AZ (US); Yasser Salah, Tempe, AZ (US)

(73) Assignee: PRINTED ENERGY PTY LTD, Brisbane, Queensland (AU)

(*) Notice: Subject to any disclaimer, the term of this patent is extended or adjusted under 35 U.S.C. 154(b) by 77 days.

(21) Appl. No.: 14/332,802

(22) Filed: Jul. 16, 2014

(65) Prior Publication Data

US 2015/0024247 A1 Jan. 22, 2015

Related U.S. Application Data

(60) Provisional application No. 61/847,479, filed on Jul. 17, 2013.

(51) Int. Cl.

| | |
|---|---|
| *H01M 2/16* | (2006.01) |
| *H01M 10/32* | (2006.01) |
| *H01M 6/40* | (2006.01) |
| *H01M 4/54* | (2006.01) |
| *H01M 4/42* | (2006.01) |
| *H01M 10/26* | (2006.01) |
| *H01M 4/50* | (2010.01) |
| *H01M 4/52* | (2010.01) |
| *H01M 4/04* | (2006.01) |
| *H01M 6/16* | (2006.01) |

(52) U.S. Cl.
CPC ............ *H01M 6/40* (2013.01); *H01M 4/42* (2013.01); *H01M 4/54* (2013.01); *H01M 10/26* (2013.01); *H01M 10/32* (2013.01); *H01M 2/1626* (2013.01); *H01M 4/0404* (2013.01); *H01M 4/044* (2013.01); *H01M 4/50* (2013.01); *H01M 4/52* (2013.01); *H01M 6/16* (2013.01); *H01M 2300/0028* (2013.01); *H01M 2300/0045* (2013.01); *Y10T 29/49115* (2015.01)

(58) Field of Classification Search
CPC ......... H01M 10/0564; H01M 10/0567; H01M 10/0568; H01M 2/1626; H01M 4/0404; H01M 4/044; H01M 4/42; H01M 4/50; H01M 4/52; H01M 4/54; H01M 6/16; H01M 6/40; H01M 10/26; H01M 10/32; H01M 2300/0028; H01M 2300/0045

See application file for complete search history.

(56) References Cited

U.S. PATENT DOCUMENTS

| | | |
|---|---|---|
| 2,912,479 A | 11/1959 | Poole |
| 4,760,494 A | 7/1988 | Crum |
| 5,573,868 A | 11/1996 | Umemoto et al. |
| 5,948,464 A | 9/1999 | Delnick |
| 6,080,283 A | 6/2000 | Ray |
| 6,124,059 A | 9/2000 | Bohnstedt et al. |
| 6,379,835 B1 | 4/2002 | Kucherovsky et al. |
| 6,527,955 B1 | 3/2003 | Sun |
| 6,641,908 B1 | 11/2003 | Clough |
| 6,728,096 B1 | 4/2004 | Smith et al. |
| 6,828,062 B2 | 12/2004 | Lu et al. |
| 7,067,104 B2 | 6/2006 | Sandhage |
| 7,348,096 B2 | 3/2008 | Schubert et al. |
| 7,615,206 B2 | 11/2009 | Sandhage et al. |
| 7,727,290 B2 | 6/2010 | Zhang et al. |
| 8,029,927 B2 | 10/2011 | Tucholski |
| 8,119,273 B1 | 2/2012 | Gerald, II et al. |
| 8,119,278 B2 | 2/2012 | Bailey et al. |
| 8,809,126 B2 | 8/2014 | Lowenthal et al. |

(Continued)

FOREIGN PATENT DOCUMENTS

| | | |
|---|---|---|
| DE | 10157272 A1 | 6/2003 |
| EP | 0875950 | 11/1998 |

(Continued)

OTHER PUBLICATIONS

Pinkert A. et al., "Ionic Liquids and Their Interaction with Cellulose," Chemical Reviews, 2009, vol. 109, pp. 6712-6728.
Gonzalez E. et al., "Surface Analysis of Polymers Treated by Remote Atmospheric Pressure Plasma," Langmuir, 2010, vol. 26(5), pp. 3710-3719.
Bao, Z. et al., "Synthesis of porous self-supporting metal-nanoparticle assemblies with 3D Morphologies inherited from biosilica templates (diatom frustules)" Advanced materials, 2009, v. 21, p. 474.

(Continued)

*Primary Examiner* — Anca Eoff
(74) *Attorney, Agent, or Firm* — Knobbe, Martens, Olson & Bear LLP

(57) ABSTRACT

An energy storage device, such as a silver oxide battery, can include a silver-containing cathode and an electrolyte having an ionic liquid. An anion of the ionic liquid is selected from the group consisting of: methanesulfonate, methylsulfate, acetate, and fluoroacetate. A cation of the ionic liquid can be selected from the group consisting of: imidazolium, pyridinium, ammonium, piperidinium, pyrrolidinium, sulfonium, and phosphonium. The energy storage device may include a printed or non-printed separator. The printed separator can include a gel including dissolved cellulose powder and the electrolyte. The non-printed separator can include a gel including at least partially dissolved regenerate cellulose and the electrolyte. An energy storage device fabrication process can include applying a plasma treatment to a surface of each of a cathode, anode, separator, and current collectors. The plasma treatment process can improve wettability, adhesion, electron and/or ionic transport across the treated surface.

20 Claims, 6 Drawing Sheets

(56) References Cited

U.S. PATENT DOCUMENTS

| | | | |
|---|---|---|---|
| 9,083,010 B2 | 7/2015 | Lockett et al. | |
| 9,136,065 B2 | 9/2015 | Lockett et al. | |
| 9,397,341 B2 | 7/2016 | Lockett et al. | |
| 2001/0009734 A1 | 7/2001 | Clough | |
| 2002/0071915 A1* | 6/2002 | Schubert et al. | 427/385.5 |
| 2002/0102465 A1 | 8/2002 | Chen et al. | |
| 2003/0027051 A1 | 2/2003 | Kejha et al. | |
| 2003/0099884 A1 | 5/2003 | Chiang et al. | |
| 2003/0113624 A1 | 6/2003 | Kim et al. | |
| 2003/0165744 A1* | 9/2003 | Schubert et al. | 429/303 |
| 2004/0023110 A1 | 2/2004 | Parent et al. | |
| 2004/0151837 A1* | 8/2004 | Morita | C01B 31/02 427/372.2 |
| 2004/0191617 A1 | 9/2004 | Visco et al. | |
| 2004/0221446 A1 | 11/2004 | Ohhara et al. | |
| 2005/0058875 A1 | 3/2005 | Jerome | |
| 2005/0175894 A1 | 8/2005 | Visco et al. | |
| 2006/0177739 A1* | 8/2006 | Endo et al. | 429/231.95 |
| 2006/0216584 A1 | 9/2006 | Cheiky | |
| 2007/0128707 A1 | 6/2007 | Rorrer et al. | |
| 2007/0212615 A1* | 9/2007 | Jost | H01M 10/0567 429/326 |
| 2007/0281854 A1 | 12/2007 | Harbour et al. | |
| 2008/0020284 A1 | 1/2008 | Michot et al. | |
| 2008/0038170 A1 | 2/2008 | Sandhage et al. | |
| 2008/0063931 A1 | 3/2008 | Zucker | |
| 2008/0209876 A1 | 9/2008 | Miller | |
| 2009/0075167 A1* | 3/2009 | Traulsen et al. | 429/176 |
| 2009/0191460 A1 | 7/2009 | Fujiwara et al. | |
| 2009/0246625 A1 | 10/2009 | Lu | |
| 2009/0272946 A1 | 11/2009 | Le | |
| 2010/0000441 A1 | 1/2010 | Jang et al. | |
| 2010/0009255 A1* | 1/2010 | Hawkins | H01G 9/2013 429/200 |
| 2010/0203362 A1* | 8/2010 | Lam | H01M 4/56 429/7 |
| 2011/0058309 A1 | 3/2011 | Eguchi et al. | |
| 2011/0059361 A1 | 3/2011 | Wilkening et al. | |
| 2011/0068296 A1 | 3/2011 | Huang et al. | |
| 2011/0134585 A1 | 6/2011 | Shen | |
| 2011/0281184 A1 | 11/2011 | Friesen et al. | |
| 2011/0311857 A1 | 12/2011 | Tucholski | |
| 2012/0028134 A1* | 2/2012 | Kim et al. | 429/342 |
| 2012/0161195 A1 | 6/2012 | Lowenthal et al. | |
| 2012/0241073 A1 | 9/2012 | Wiest et al. | |
| 2012/0264034 A1 | 10/2012 | Waki et al. | |
| 2013/0052509 A1 | 2/2013 | Halalay et al. | |
| 2013/0089769 A1 | 4/2013 | Proctor et al. | |
| 2013/0280579 A1 | 10/2013 | Wright et al. | |
| 2014/0002788 A1 | 1/2014 | Otts et al. | |
| 2014/0014403 A1 | 1/2014 | Miller et al. | |
| 2014/0017557 A1 | 1/2014 | Lockett et al. | |
| 2014/0017558 A1 | 1/2014 | Lockett et al. | |
| 2014/0017571 A1 | 1/2014 | Lockett et al. | |
| 2014/0023907 A1 | 1/2014 | Lockett et al. | |
| 2014/0072886 A1* | 3/2014 | Urban et al. | 429/406 |
| 2014/0099528 A1 | 4/2014 | Lockett et al. | |
| 2014/0134503 A1 | 5/2014 | Lockett et al. | |
| 2015/0287978 A1 | 10/2015 | Lockett et al. | |
| 2016/0002054 A1 | 1/2016 | Lockett et al. | |
| 2016/0031843 A1* | 2/2016 | Socha et al. | |
| 2016/0322648 A1 | 11/2016 | Lockett et al. | |

FOREIGN PATENT DOCUMENTS

| | | |
|---|---|---|
| JP | 59139574 A | 8/1984 |
| JP | 06-260208 | 9/1994 |
| JP | 06251759 A | 9/1994 |
| JP | 07-304984 | 11/1995 |
| JP | 2000-003713 | 1/2000 |
| JP | 2001-176554 | 6/2001 |
| JP | 2003-077445 | 3/2003 |
| JP | 2010-155761 | 7/2010 |
| JP | 2012-033366 | 2/2012 |
| WO | WO 00/55930 A1 | 9/2000 |
| WO | WO 2007/116649 | 10/2007 |
| WO | WO 2010/093219 * | 9/2010 |
| WO | WO 2012/037171 | 3/2012 |
| WO | WO 2014/014758 | 1/2014 |
| WO | WO 2014/059127 | 4/2014 |
| WO | WO 2014/106088 | 7/2014 |

OTHER PUBLICATIONS

Baruah, S. et al., "Hydrothermal growth of ZnO nanostructures" Sci. Technol. Adv. Mater., 2009, 10, 013001.

Cai, Y. et al., "Manganese-doped zinc orthosilicate-bearing phosphor microparticles with controlled three-dimentional shapes derived from diatom frustules" Journal of the American Ceramic Society, 2007, 90(4), 1304.

Choma, J. et al., "Deposition of silver nanoparticles on silica spheres and rods" Colloids and Surfaces A: Physicochem. Eng. Aspects, 2012, doi: 10.1016/j.colsurfa.2012.07.004.

Drum, R.W. et al, "Star Trek replicators and diatom nanotechnology" Trends in Biotechnology, 2003, 21(8), 325.

F.A.S. Sterrenberg. "How to prepare diatom samples" micrap.selfip. com:81/micrapp/cleandiatoms.pdf, 13 pages, undated.

Fang, Y. et al., "Protein-mediated layer-by-layer synthesis of free-standing microscale titania structures with biologically assembled 3-D morphologies" Chemistry of materials, 2009, 21(24), 5704.

Fang, Y. et al., "Synthesis of nanostrcutured Cu- and Ni-based micro-assblies with selectable 3-D hierarchical biogenic morphologies" Journal of Materials Chemistry, 2012, 22(4), 1305.

Flores, J.C. et al., "Preparation of core-shell nanospheres of silica-silver: SiO2@Ag" Journal of Non-Crystalline Solids, 2008, 354, 5435.

Flores, J.C. et al., "Variations in morphologies of silver nanoshells on silica spheres" Colloids and Surfaces A: Physicochem. Eng. Aspects, 2008, 330, 86.

Forsyth et al., "Ionic Liquids—An Overview," Aust. J. Chem., vol. 57, No. 2, Jan. 1, 2004, pp. 113-119.

Franks, G.V. et al., "Zeta potentials and yield stresses of silica suspensions in concentrated monovalent electrolytes: isoelectric point shift and additional attraction" Journal of Colloid and Interfacial Science, 2002, 249, 44.

Gordon, R. et al., "The Glass Menagerie: diatoms for novel application in nanotechnology" Trends Biotechnol., 2009, v.27, p. 116.

Greene, L.E. et al., "General route to vertical ZnO nanowire arrays using textured ZnO seeds" Nano Lett., 2005, 5, 1231.

Gutu, T. et al., "Electron microscopy and optical characterization of cadmium sulphide nanocrystals deposited on the patterned surface of diatom biosilica" Journal of Nanomaterials, vol. 2009, Article ID 860536, 7 pages, Feb. 19, 2009.

Ho, C. C. et al.., "Direct Write Dispenser Printing of a Zinc Microbattery with an Ionic Liquid Gel Electrolyte," J. Micromech. Microeng., 2010, vol. 20 104009, pp. 1-9.

Huang, Lu et al., "Graphene-Based Conducting Inks for Direct Inkjet Printing of Flexible Conductive Patterns and Their Applications in Electric Circuits and Chemical Sensors," Nano Research, 2011, vol. 4, Issue 7, pp. 675-684.

International Search Report and Written Opinion in PCT Application No. PCT/US2013/064309, mailed on Jan. 24, 2014, in 13 pages.

Jeffryes, C. et al., "Peptide mediated deposition of nanostructured TiO2 into the periodic structure of diatom biosilica. Journal of material research" 2008, 23(12), 3255.

Jeffryes, C. et al., "The potential of diatom nanobiotechnology for applications in solar cells, batteries, and electroluminescent devices" Energy & Enviromental Science, 2011, v. 4, p. 3930.

Kalmychkov, G. V. et al., "Method of separation of diatom frustules from bottom sediments for oxygen isotopic analysis and paleoclimatic reconstruction" Geokhimiya, 2005, 12, 1358.

Kim, J. et al., "Direct synthesis and integration of functional nanostructures in microfluidic devices" Lab on Chip, 11, p. 1946-1951, 2011.

Kumar, M. et al., "Chemical vapor deposition of carbon nanotubes: a review on growth mechanism and mass production" Journal of Nanoscience and Nanotechnology, 2010, 10, 3739.

(56) References Cited

OTHER PUBLICATIONS

Lebeau T. et al., "Diatom cultivation and biotechnologically relevant products. Part I: cultivation at various scales" Appl. Microbiol. Biotechnol., 2003, 60, 612.
Lee, Seung-Jin et al., "Rapid Hydrolysis of Organophosphorous Esters Induced by Nanostructured, Flourine-Doped Titania Replicas of Diatom Frustules" J. Am. Ceram. Soc., 90 [5], p. 1632-1636, 2007.
Li, H. et al., "Peptide-mediated deposition of nanostructured TiO2 into the periodic structure of diatom biosilica and its integration into the fabrication of a dye-sensitized solar cell device" Materials Research Society Symposium Proceedings, 2009, 1189E.
Mirkin, C.A. et al., AFOSR Final report. "Diatomeceous, fungal, and bacterial building blocks for material synthesis" 2008.
Nassif, N. et al., "From Diatoms to silica-based biohybrids" Chem Soc Rev, 2011, v.40, p. 849-859.
Parkinson, J. et al., "Beyond micromashinning: the potential of diatoms" Nanotechnology. 1999, v. 17, p. 190.
Payne, E. K. et al., "Sacrificial Biolofical Templates for the Formation of Nanostructured Metallic Microshells" Chem., Int. Ed., 2005, v. 44, p. 5064.
Pol, V.G. et al., "Sonochemical Deposition of Silver Nanoparticles on Silica Spheres" Langmuir, 2002, 18, 3352.
Prout, L. et al., "Aspects of lead/acid battery technology. 7. Separators" Journal of Power Sources (1993), 46(1), 117-38.
Renberg, I. et al., "A procedure for preparing large sets of diatom slides from sediment cores" Journal of Paleolimnology, 1990, 4, 87.
Rings, A. et al., "A new method for the quantitative separation of diatom frustules from lake sediments" Limnology and Oceanography: Methods, 2004, 2, 25.
Round, F. E. et al., "The Diatoms: biology & morphology of the genera" 1990.
Sandhage, K. et al., "Bio-enabled synthesis of functional 3-D nanostructured materials via layer-by-layer deposition" International Chemical Congress of Pacific Basin Societies, Honolulu. 2010.
Sandhage, K. H. et al., "Novel, Bioclastic Route to Self-Assembled, 3D, Chemically Tailored Meso/Nanostructures: Shape-Preserving Reactive Conversion of Biosilica (Diatom) Microshells" Adv. Mater., 2002, v. 14, No. 6, p. 429-433.
Sandhage, K.H. et al., "Merging biological self-assembly with synthetic chemical tailoring: The potential for 3-D genetically engineered micro/nano-devices (3-D GEMS)" International Journal of Applied Ceramic Technology (2005), 2(4), 317.
Serieyssol, K. et al., "Diatom fossils in mires: a protocol for extraction, preparation and analysis in palaeoenvironmental studies" Mires and Peat, 2010, 7, 1.
Shen, Lanyao et al., "Magnesiothermically reduced diatomaceous earth as a porous silicon anode material for lithium ion batteries" Journal of Power Sources (2012), 213, 229-232.
Shian, S. et al., "Three-Dimensional Assemblies of Zirconia Nanocrystals via Shape-Preserving Reactive Conversion of Diatom Microshells" J. Am. Ceram. Soc., 2006, v. 89, p. 694-698.
Skipp, G.L. et al., "Improved density gradient techniques using sodium poltungstate and a comparison to the use of other heavy liquids" U.S. department of the Interior. U.S. Geological survey, 1993, OF 92-038.
Tang, S. et al., "Ultasonic electrodeposition of silver nanoparticles on dielectric silica spheres" Nanotechnology, 2007, 18, 295607.
Torrisi, F. et al., "Ink-Jet Printed Graphene Electronics," Condensed Matter, 2011, pp. 1-12.
Toster, J. et al., "Controlling anatase coating of diatom frustules by varying the binding layer" Cryst. Eng. Comm. 2012, 14(2), 3446.
Tuval, T. et al., "A microwave-assisted polyol method for the deposition for silver nanoparticles on silica spheres" Nanotechnology, 2007, 18, 255601.
Umemura, K. et al., "Preparation of photocatalyst using diatom frustules by liquid phase deposition method" Journal of Nanoscience and Nanotechnology, 2010, 10(8), 4883.
Unalan, H.E. et al., "Rapid synthesis of aligned zinc oxide nanowires" Nanotechnology, 2008, 19, 255608.
Wang, Z. et al., "Facile fabrication method and characterization of hollow Ag/SiO2 double-shelled spheres" Langmuir, 2009, 25(13), 7646.
Weatherspoon, M.R. et al., "Thin, conformal, and continues SnO2 coatings on three-dimensional biosilica templates through hydroxyl-group amplification and layer-by-layer alkoxide deposition" Angewandte Chemie, 2007, 46(30), 5724.
Xia, H. et al., "Surface synthesis of zinc oxide nanoparticles on silica spheres: preparation and characterization" J. Phys. Chem. B, 2003, 107, 9175.
Xu, S. et al., "One-dimentional ZnO nanostructures: solution growth and functional properties" NanoRes, 2011, doi 10.1007/s12274-011-0160-7.
Ye, X. et al., "Deposition of silver nanoparticles on silica spheres via ultrasound irradiation" Applied Surface Science, 2007, 253, 6264.
Yu, Y. et al., "Surface modification of diatomaceous earth silica microparticles with functional silanes for metal ions sorption" CHEMECA. Sep. 26-29, 2010, Adelaide, Australia.
Zhang et al., "One-pot synthesis of hierarchical MnO2-modified diatomites for electromechanical capacitor electrodes" Journal of Power Sources, vol. 246, Aug. 6, 2013, pp. 449-456.
Zhang, Y. et al., "Synthesis, characterization, and applications of ZnO nanowires" Journal of Nanomaterials, 2012, doi: 10.1155/2012/624520.
Zheng, S. et al., "Preparation and Photocatalytic Property of TiO2/Diatomite-Based Porous Ceramics Composite Materials" International Journal of Photoenergy, vol. 2012, Article ID 264186, p. 1-4, 2011.
Zhuravlev, L.T. et al., "The surface chemistry of amorphous silica. Zhuravlev model" Colloids and Surfaces A: Physicochemical and Engineering Aspects, 2000, 173, 1.
Sutto et al., "Ionic liquid batteries: Chemistry to replace alkaline/acide energy storage devices" Electrochimica Acta 56 (2011), 3375-3379.

* cited by examiner

PRINTED SILVER OXIDE BATTERIES

REFERENCE TO RELATED APPLICATIONS

This application claims the benefit of U.S. Provisional Patent Application Ser. No. 61/847,479, filed Jul. 17, 2013, entitled "PRINTABLE SILVER OXIDE BATTERIES WITH NON-ALKALINE ELECTROLYTE," which is hereby incorporated herein by reference in its entirety.

Any and all applications for which a foreign or domestic priority claim is identified in the Application Data Sheet as filed with the present application are hereby incorporated by reference under 37 C.F.R. §1.57.

BACKGROUND

Field

This application relates to energy storage devices, particularly to printed energy storage devices.

Description of the Related Art

Energy storage devices, such as silver-containing primary or secondary batteries (e.g., silver-oxide batteries), can provide desired energy and/or power density performances, having increased energy storage capability and/or being able to charge and/or discharge quickly. Silver-containing batteries may provide a flat discharge voltage curve (e.g., providing consistent voltage performance), can be low maintenance and/or safe to operate. Silver-containing batteries may also be made of non-toxic and/or non-explosive components.

Conventionally available silver-containing batteries have various shortcoming which may contribute to increased costs and/or difficulty in manufacturing and/or transportation of these batteries.

SUMMARY

An energy storage device may include a silver-containing cathode, and an electrolyte including an ionic liquid having an anion selected from the group consisting of: methanesulfonate, methylsulfate, acetate, and fluoroacetate.

In some embodiments, the silver-containing cathode can include at least one of silver(I) oxide ($Ag_2O$), silver(I,III) oxide (AgO), manganese(IV) oxide ($MnO_2$), nickel oxyhydroxide (NiOOH), and silver nickel oxide ($AgNiO_2$).

The energy storage device may include an anode. In some embodiments, the anode can include at least one of zinc, cadmium, iron, nickel, aluminum, metal hydrate, and hydrogen.

In some embodiments, at least one of the cathode and the anode are printed.

In some embodiments, at least one of the anode and the cathode can include a conductive additive. The conductive additive may include at least one of a conductive carbon and a metal. In some embodiments, the conductive carbon can include at least one of graphite, graphene, and carbon nanotubes.

In some embodiments, at least one of the cathode and anode can include a polymer binder. The polymer binder may include at least one of polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycol-hexafluoropropylene, polyethylene terephthalate, polyacrylonitrile, polyvinyl butyral, polyvinylcaprolactam, polyvinyl chloride; polyimide polymers and copolymers (including aliphatic, aromatic and semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organo-modified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, and chitosan.

The energy storage device may include a separator between the anode and the cathode. In some embodiments, the separator can include the electrolyte. In some embodiments, the separator is printed.

The printed separator may include dissolved cellulose. In some embodiments, the dissolved cellulose of the printed separator can include dissolved cellulose from at least one of lignin, cotton, rayon, regenerated cellulose, α-cellulose, wood, xylan, lyocell, and bagasse.

In some embodiments, the separator is non-printed. The non-printed separator may include at least partially dissolved cellulose. In some embodiments, the non-printed separator can include at least one of borosilicate glass, asbestos, potassium titanate fibers, and zirconium oxide. In some embodiments, the non-printed separator can include at least one of polyamide, polyolefin, and fibrous sausage casing.

The energy storage device may include at least one current collector. In some embodiments, the at least one current collector is directly adjacent to and in contact with the cathode or the anode. In some embodiments, the at least one current collector can include a metallic foil. In some embodiments, a substrate upon which the energy storage device is fabricated can include the at least one current collector. In some embodiments, the at least one current collector is a printed current collector.

In some embodiments, at least one of the cathode, anode, at least one current collector, and separator can include a surface treated by a surface modification process. In some embodiments, each of the cathode, anode, at least one current collector, and separator can include a surface treated by a surface modification process. In some embodiments, a surface of a substrate can be treated by the surface modification process. The surface modification process may include a plasma treatment process.

In some embodiments, the ionic liquid is a basic ionic liquid. In some embodiments, the ionic liquid can include a cation selected from the group consisting of: imidazolium, pyridinium, ammonium, piperidinium, pyrrolidinium, sulfonium, and phosphonium. In some embodiments, the cation can include at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

In some embodiments, the electrolyte can include an additive configured to improve ionic conductivity. The additive may include an organic solvent. In some embodiments, the organic solvent can include at least one of ethers, esters, alkyl carbonates, and nitriles.

The additive may include a salt. In some embodiments, the salt can include a cation selected from: lithium, zinc, cadmium, nickel, aluminum, silver, cobalt. In some embodiments, the salt can include an anion selected from: tris(pentafluoroethyl)trifluorophosphate, trifluoromethanesulfonate, hexafluorophosphate, tetrafluoroborate, ethyl sulfate, dimethyl phosphate, trifluoromethanesulfonate, methanesulfonate, triflate, tricyanomethanide, dibutylphosphate, bis(trifluoromethylsulfonyl)imide, bis-2,4,4-(trimethylpentyl)phosphinate, iodide, chloride, bromide, nitrate, methanesulfonate, methylsulfate, acetate, and fluoroacetate.

An ink for an electrode of an energy storage device may include an ionic liquid having an anion selected from the group consisting of: methanesulfonate, methylsulfate, acetate, and fluoroacetate, an electrode active component, and a solvent.

In some embodiments, the electrode active component can include at least one of silver(I) oxide ($Ag_2O$), a silver (I,III) oxide (AgO), manganese(IV) oxide ($MnO_2$), nickel oxyhydroxide (NiOOH), and silver nickel oxide ($AgNiO_2$). In some embodiments, the electrode active component can include at least one of zinc, cadmium, iron, nickel, aluminum, metal hydrate, and hydrogen. In some embodiments, the electrode active component can include zinc.

In some embodiments, the ionic liquid is a basic ionic liquid. In some embodiments, the ionic liquid can include a cation selected from the group consisting of: imidazolium, pyridinium, ammonium, piperidinium, pyrrolidinium, sulfonium, and phosphonium. In some embodiments, the cation can include at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

In some embodiments, the solvent can include at least one of water, alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; lactones such as butyl lactone; ethers such as methyl ethyl ether, diethyl ether, ethyl propyl ether, and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, n-butyl acetate, dimethyl adipate, proplyene glycol monomethyl ether acetate, dimethyl glutarate, dimethyl succinate, glycerin acetate, carboxylates; carbonates such as propylene carbonate; polyols (or liquid polyols), glycerols and other polymeric polyols or glycols such as glycerin, diol, triol, tetraol, pentaol, ethylene glycols, diethylene glycols, polyethylene glycols, propylene glycols, dipropylene glycols, glycol ethers, glycol ether acetates 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol; tetramethyl urea, n-methylpyrrolidone, acetonitrile, tetrahydrofuran (THF), dimethyl formamide (DMF), N-methyl formamide (NMF), dimethyl sulfoxide (DMSO); thionyl chloride; sulfuryl chloride; cyclohexanone, dimethyl acetamide, dimethyl sulfoxide, triethyl phosphate, and isophorone.

The ink may include a polymer binder. In some embodiments, the polymer binder can include at least one of a polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycolhexafluoropropylene, polyethylene terephthalate, polyacrylonitrile, polyvinyl butyral, polyvinylcaprolactam, polyvinyl chloride; polyimide polymers and copolymers (including aliphatic, aromatic and semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organomodified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, and chitosan.

The ink may include a conductive additive. In some embodiments, the conductive additive can include at least one of a conductive carbon and a metal.

An ink for a separator of an energy storage device may include an electrolyte including an ionic liquid having an anion selected from the group consisting of: methanesulfonate, methylsulfate, acetate, and fluoroacetate, and dissolved cellulose.

In some embodiments, the ionic liquid is a basic ionic liquid. In some embodiments, the ionic liquid can include a cation selected from the group consisting of imidazolium, pyridinium, ammonium, piperidinium, pyrrolidinium, sulfonium, and phosphonium. In some embodiments, the cation can include at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

In some embodiments, the dissolved cellulose can include dissolved cellulose from at least one of lignin, cotton, rayon, regenerated cellulose, α-cellulose, wood, xylan, lyocell, and bagasse.

The ink may include an organic solvent. In some embodiments, the organic solvent can include a polar aprotic organic solvent. In some embodiments, the polar aprotic organic solvent can include at least one of triethanolamine, ethylenediamine, pentylamine, N-Methylmorpholine N-oxide, dimethylacetamide, dimethylsulfoxide, and tetrabutylammonium fluoride trihydrate.

The dissolved cellulose may include cellulose which was subjected to a pretreatment process. In some embodiments, the pretreatment process can include at least one of mechanical milling of the cellulose, applying microwave radiation to the cellulose, and applying ultrasonic radiation to the cellulose.

An electrode of an energy storage device may include an electrolyte including an ionic liquid having an anion selected from the group consisting of: methanesulfonate, methylsulfate, acetate, and fluoroacetate, and an electrode active component.

The electrode may be a cathode of the energy storage device, and the electrode active component of the cathode may include a silver-containing component. In some embodiments, the silver containing component can include at least one of silver(I) oxide ($Ag_2O$), silver(I,III) oxide (AgO), manganese(IV) oxide ($MnO_2$), nickel oxyhydroxide (NiOOH), and silver nickel oxide ($AgNiO_2$).

The electrode may be an anode of the energy storage device, and the energy storage device may be a silver oxide battery. In some embodiments, the electrode active component of the anode can include at least one of zinc, cadmium, iron, nickel, aluminum, metal hydrate, and hydrogen. In some embodiments, the electrode active component of the anode can include zinc.

In some embodiments, the ionic liquid is a basic ionic liquid. In some embodiments, the ionic liquid can include a cation selected from the group consisting of: imidazolium, pyridinium, ammonium, piperidinium, pyrrolidinium, sulfonium, and phosphonium. In some embodiments, the cation can include at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

The electrode may include a polymer binder. In some embodiments, the polymer binder can include at least one of a polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycolhexafluoropropylene, polyethylene terephthalate, polyacrylonitrile, polyvinyl butyral, polyvinylcaprolactam, polyvinyl chloride; polyimide polymers and copolymers (including aliphatic, aromatic and semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organomodified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, and chitosan.

The electrode may include a conductive additive. In some embodiments, the conductive additive can include at least one of a conductive carbon and a metal.

In some embodiments, the energy storage device can be at least one of a primary silver oxide battery and a secondary silver oxide battery.

A separator for an energy storage device may include a membrane having at least partially dissolved cellulose, and an electrolyte including an ionic liquid having an anion selected from the group consisting of: methanesulfonate, methylsulfate, acetate, and fluoroacetate.

The energy storage device may be a silver oxide battery.

In some embodiments, the ionic liquid can include a cation selected from the group consisting of imidazolium, pyridinium, ammonium, piperidinium, pyrrolidinium, sulfonium, and phosphonium. In some embodiments, the cation can include at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

In some embodiments, the ionic liquid is a basic ionic liquid.

In some embodiments, the separator is a non-printed separator. In some embodiments, the non-printed separator can include at least partially dissolved regenerated cellulose.

In some embodiments, the separator is a printed separator. In some embodiments, the at least partially dissolved cellulose of the printed separator is fully dissolved. The fully dissolved cellulose may include dissolved cellulose from at least one of lignin, cotton, rayon, regenerated cellulose, α-cellulose, wood, xylan, lyocell, and bagasse.

In some embodiments, the fully dissolved cellulose can include cellulose which was subjected to a pretreatment process. In some embodiments, the pretreatment process can include at least one of mechanical milling of the cellulose, applying microwave radiation to the cellulose, and applying ultrasonic radiation to the cellulose.

In some embodiments, the energy storage device can include a cathode having at least one of silver(I) oxide ($Ag_2O$), silver(I,III) oxide (AgO), manganese(IV) oxide ($MnO_2$), nickel oxyhydroxide (NiOOH), and silver nickel oxide ($AgNiO_2$). In some embodiments, the energy storage device can include an anode having at least one of zinc, cadmium, iron, nickel, aluminum, metal hydrate, and hydrogen.

A process for treating a surface of an energy storage device during fabrication of the energy storage device may include applying a plasma treatment process to the surface, wherein the plasma treatment process is configured to increase at least one of a wettability of, adhesion of, electron conductivity across, and ionic conductivity across of the surface, and applying a subsequent layer of the energy storage device onto the treated surface.

In some embodiments, applying the subsequent layer of the energy storage device can include printing the subsequent layer of the energy storage device onto the treated surface.

In some embodiments, applying the plasma treatment process can include directing a plasma source at the surface of the energy storage device at a temperature of about 25° C. and under atmospheric pressure.

The process may include selecting at least one parameter of the plasma treatment process based on a type of the surface being treated and/or a type of surface modification being performed. In some embodiments, applying the plasma treatment process can include applying an oxygen gas containing plasma to the surface of the energy storage device. In some embodiments, applying the plasma treatment process can include applying a plasma having at least one of a nitrogen gas, hydrogen gas and carbon tetrafluoride gas, to the surface of the energy storage device.

In some embodiments, the energy storage device can include a current collector, and wherein applying the plasma treatment process can include applying the plasma treatment process to a surface of the current collector of the energy storage device.

In some embodiments, the energy storage device can include an electrode, and wherein applying the plasma treatment process can include applying the plasma treatment process to a surface of the electrode of the energy storage device.

In some embodiments, the energy storage device can include a separator, and wherein applying the plasma treatment process can include applying the plasma treatment process to a surface of the separator of the energy storage device.

In some embodiments, the plasma treatment process can be configured to increase an electron conductivity of across the treated surface. In some embodiments, the plasma treatment process can be configured to increase an ionic conductivity of across the treated surface.

The process may include applying a plasma treatment process to a surface a substrate upon which the energy storage device is fabricated.

In some embodiments, the energy storage device can be a battery. The battery may be at least one of a primary silver oxide battery and a second silver oxide battery.

A method of manufacturing an energy storage device may include printing an electrode of the energy storage device, wherein the electrode can include an ionic liquid having an anion selected from the group consisting of: methanesulfonate, methylsulfate, acetate, and fluoroacetate.

In some embodiments, the ionic liquid is a basic ionic liquid. In some embodiments, the ionic liquid can include a cation selected from the group consisting of: imidazolium, pyridinium, ammonium, piperidinium, pyrrolidinium, sulfonium, and phosphonium. In some embodiments, the cation can include at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

The energy storage device may be a silver oxide battery.

In some embodiments, the electrode can be a cathode of the energy storage device. In some embodiments, the electrode can include at least one of silver(I) oxide ($Ag_2O$), silver(I,III) oxide (AgO), manganese(IV) oxide ($MnO_2$), nickel oxyhydroxide (NiOOH), and silver nickel oxide ($AgNiO_2$).

In some embodiments, the electrode can be an anode of the energy storage device. In some embodiments, the electrode can include at least one of zinc, cadmium, iron, nickel, aluminum, metal hydrate, and hydrogen.

In some embodiments, the electrode can include at least one of a polymer binder, a conductive additive, and a solvent.

In some embodiments, the method can include providing a separator. Providing the separator may include printing the separator. In some embodiments, printing the separator can include dissolving a cellulose material. In some embodiments, dissolving the cellulose material can include immersing the cellulose material in a soaking chemistry including an ionic liquid. In some embodiments, the ionic liquid can include an anion selected from the group consisting of: chloride, acetate, methanesulfonate, bromide, and formate. In some embodiments, the method can include pretreating the cellulose material by applying at least one of mechanical milling, ultrasonic radiation, and microwave radiation, to the cellulose material. In some embodiments, the method can include adding a polar aprotic organic solvent to the dissolved cellulose material. The polar aprotic organic solvent may include at least one of triethanolamine, ethylenediamine, pentylamine, N-Methylmorpholine N-oxide, dimethylacetamide, dimethylsulfoxide, and tetrabutylammonium fluoride trihydrate.

Providing the separator may include inserting the separator between the electrode and a second electrode of the energy storage device.

In some embodiments, inserting the separator can include partially dissolving a cellulose material.

In some embodiments, partially dissolving the cellulose material can include partially dissolving a regenerated cellulose material. In some embodiments, partially dissolving the cellulose material can include immersing the cellulose material in a soaking chemistry including an ionic liquid. In some embodiments, the ionic liquid can include an anion selected from the group consisting of: chloride, acetate, methanesulfonate, bromide, and formate.

In some embodiments, the method can include adding an electrolyte to the energy storage device. The electrolyte may include the ionic liquid.

In some embodiments, the electrolyte further can include a conductive additive. The conductive additive may include at least one of an organic solvent and a salt.

In some embodiments, the method may include coupling a current collector to the electrode. Coupling the current collector may include coupling a conductive foil to the electrode. In some embodiments, coupling the current collector can include printing the electrode over the current collector.

In some embodiments, the method can include applying a plasma treatment process to a surface of at least one of the electrode, separator, and current collector of the energy storage device. In some embodiments, the method can include applying a plasma treatment process to a surface of each of the electrode, separator, and current collector of the energy storage device.

In some embodiments, the plasma treatment process can be configured to improve at least one of an adhesion of, wettability of, electron conductivity across, and ionic conductivity across the treated surface. In some embodiments, applying the plasma treatment process can include applying a plasma including at least one of an oxygen, hydrogen, nitrogen and carbon tetrafluoride gas.

In some embodiments, dissolving the cellulose material or partially dissolving the cellulose material can include placing the cellulose material in a mixture having a first ionic liquid having a first ionic conductivity and a first dissolution effect upon the cellulose material, and a second ionic liquid having a second ionic conductivity greater than the first ionic conductivity and a second dissolution effect upon the cellulose material. In some embodiments, the second dissolution effect is less than the first dissolution effect.

In some embodiments, dissolving the cellulose material or partially dissolving the cellulose material can include placing the cellulose material in a mixture having a first ionic liquid having a first ionic conductivity and a first dissolution effect upon the cellulose material, and a second ionic liquid having a second ionic conductivity and a second dissolution effect upon the cellulose material less than the first dissolution effect. In some embodiments, the second ionic conductivity is greater than the first ionic conductivity.

An energy storage device may include a silver-containing cathode, an anode, a separator between the anode and the cathode, and an electrolyte including an ionic liquid having an anion selected from the group consisting of: methanesulfonate, methylsulfate, acetate, and fluoroacetate.

In some embodiments, the silver-containing cathode can include at least one of silver(I) oxide ($Ag_2O$), silver(I,III) oxide (AgO), manganese(IV) oxide ($MnO_2$), nickel oxyhydroxide (NiOOH), and silver nickel oxide ($AgNiO_2$). In some embodiments, the anode can include zinc.

In some embodiments, the ionic liquid can include a cation selected from the group consisting of: imidazolium, pyridinium, ammonium, piperidinium, pyrrolidinium, sulfonium, and phosphonium.

In some embodiments, the electrolyte can include an additive configured to improve ionic conductivity. The additive may include an organic solvent. In some embodiments, the organic solvent can include at least one of ethers, esters, alkyl carbonates, and nitriles.

In some embodiments, the separator can include at least partially dissolved cellulose. The at least partially dissolved cellulose may include at least partially dissolved regenerated cellulose.

An ink for an electrode of an energy storage device may include an ionic liquid having an anion selected from the group consisting of: methanesulfonate, methylsulfate, acetate, and fluoroacetate, an electrode active component, and a solvent.

In some embodiments, the electrode active component can include at least one of silver(I) oxide ($Ag_2O$), silver(I, III) oxide (AgO), manganese(IV) oxide ($MnO_2$), nickel oxyhydroxide (NiOOH), and silver nickel oxide ($AgNiO_2$). In some embodiments, the electrode active component can include zinc.

In some embodiments, the ionic liquid can include a cation selected from the group consisting of: imidazolium, pyridinium, ammonium, piperidinium, pyrrolidinium, sulfonium, and phosphonium. In some embodiments, the solvent can include at least one of tetramethyl urea, n-methylpyrrolidone, and triethyl phosphate.

A method of manufacturing an energy storage device may include printing a first electrode over a substrate, wherein the first electrode can include an ionic liquid having an anion selected from the group consisting of: methanesulfonate, methylsulfate, acetate, and fluoroacetate.

In some embodiments, the ionic liquid can include a cation selected from the group consisting of: imidazolium, pyridinium, ammonium, piperidinium, pyrrolidinium, sulfonium, and phosphonium.

The energy storage device may be a silver oxide battery.

In some embodiments, the method can include forming a second electrode over the first electrode; and forming a separator including at least partially dissolved cellulose, the separator between the first electrode and the second electrode.

In some embodiments, the method can include, prior to printing the first electrode, plasma treating a surface of the substrate, prior to forming the separator, plasma treating a surface of the first electrode, and prior to printing the second electrode, plasma treating a surface of the separator. In some embodiments, the plasma treating improves at least one of an adhesion, wettability, and ionic conductivity of the plasma treated surface of the substrate, the plasma treated surface of the first electrode, and the plasma treated surface of the separator.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Figure 1:
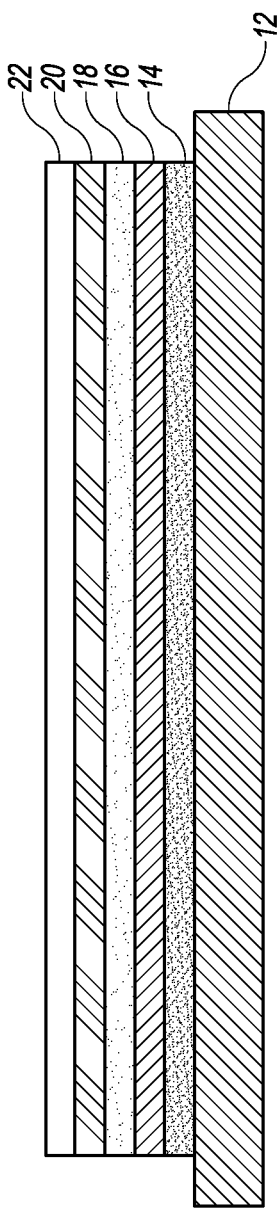
FIG. 1 is a schematic cross-sectional side view or elevational view of an example of an energy storage device.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Conventionally available silver-containing batteries, including primary or secondary batteries that include a silver-containing cathode (e.g., silver oxide zinc batteries), typically utilize alkaline based electrolytes, such as aqueous solutions comprising alkali hydroxides (e.g., sodium hydroxide (NaOH), and/or potassium hydroxide (KOH)), and can provide operating voltages of about 1.2 Volts (V) (e.g., silver-containing batteries having a cadmium (Cd) containing and/or an iron (Fe) containing anode), and about 1.5 V to about 1.8 V (e.g., silver-containing batteries having a zinc (Zn) containing anode). Aqueous alkaline-based electrolytes can be chemically aggressive and can corrode manufacturing equipment used in fabrication of the silver-containing batteries. Aqueous alkaline-based electrolytes in silver-containing batteries may evaporate if the batteries are not properly sealed and/or appropriate procedures are not performed during manufacturing of the batteries to reduce or avoid evaporation of the aqueous electrolyte.

Energy storage devices described herein can be a primary or a secondary silver-containing battery. For example, the energy storage device may be a silver-containing primary battery or a silver-containing secondary battery having a silver-containing cathode (e.g., a cathode comprising silver-oxide) and a zinc-containing anode. In contrast to conventionally available silver-containing batteries, the energy storage device can include an electrolyte including one or more ionic liquids, such as ionic liquids configured to facilitate desired energy storage device electrical and/or lifetime performances and/or provide desired interaction with one or more other components of the energy storage device. The one or more ionic liquids can be basic ionic liquids, may include an anion selected from the group consisting of methanesulfonate, methylsulfate, acetate, and fluoroacetate, and/or may include a cation selected from the group consisting of imidazolium, pyridinium, ammonium, piperidinium, pyrrolidinium, sulfonium, and phosphonium. One or multiple portions of the device, such as anode, cathode, and separator between anode and cathode, may comprise the electrolyte. Ionic liquids can be non-corrosive and/or non-volatile, so use of electrolytes comprising ionic liquids may facilitate simplification of processes for manufacturing and/or transport of the energy storage devices.

The energy storage device may include a separator comprising cellulose between its cathode and anode. The separator can be printed, for example fabricated using dissolved cellulose. The separator can alternatively be non-printed, for example fabricated using at least partially dissolved regenerated cellulose.

A process for fabricating the energy storage device may include a surface modification process, such as a plasma treatment process. A plasma treatment process may be applied to a surface prior to positioning a component of the energy storage device onto the surface, providing a treated surface having improved adhesion, wettability, ionic conductivity (e.g., improving ionic conductivity across a surface between a separator and an electrode), and/or electron conductivity (e.g., improving electron conductivity across a surface between a current collector and an electrode). For example, a plasma treatment process may be applied to a surface of each component of the energy storage device prior to positioning a subsequent component of the energy storage device onto the treated surface. A plasma treatment process can be applied to a surface of a substrate prior to assembling components of an energy storage device over the substrate surface. Energy storage devices described herein can advantageously be fabricated using non-toxic and/or non-aggressive materials and/or processes, facilitating fabrication and/or transportation of the energy storage devices.

FIG. 1 shows a schematic cross-sectional side view or elevational view of an example of an energy storage device 10, such as a silver-containing battery (e.g., a primary or a secondary silver-containing battery). Components of the energy storage device 10 can be assembled as layers over a substrate 12. The energy storage device 10 includes a first electrode 16 over the substrate 12, a separator 18 over the first electrode 16, and a second electrode 20 over the separator 18. The energy storage device 10 can optionally include a first current collector 14 over the substrate 12, and the first electrode 16 can be over and coupled to the first current collector 12. The energy storage device 10 can optionally include a second current collector 22 over and coupled to the second electrode 20. In some embodiments, one, some, or all of the current collector(s), electrodes, and separator of the energy storage device 10 can be directly over or adjacent to the previously-fabricated component, for example such that the first current collector 14 is directly over or adjacent to the substrate 12, the first electrode 16 is directly over or adjacent to the first current collector 14, the separator 18 is directly over or adjacent to the first electrode 16, the second electrode 20 is directly over or adjacent to the separator 18, and/or the second current collector 22 is directly over or adjacent to the second electrode 20. A thickness of each layer of the energy storage device 10 may be selected based on a desired application of the device 10 (e.g., a desired energy storage capacity and/or resistance). In some embodiments, a thickness of one or more layers of the energy storage device 10 can be about 0.5 micrometers or microns (μm) to about 1,000 μm.

In some embodiments, the substrate 12 can serve as a current collector for the energy storage device 10. Referring to FIG. 1, an electrically conductive substrate 12 may serve as a first current collector for the energy storage device 10. In certain such embodiments, the first electrode 16 can be over and coupled to the substrate 12 without a first current collector 14. For example, the first electrode 16 can be directly over or adjacent to the substrate 12 without an intervening first current collector 14.

In some embodiments, the energy storage device 10 includes one or more components which are printed over the substrate 12. In some embodiments, each of the first current collector 14, the first electrode 16, the separator 18, the second electrode 20, and the second current collector 22 can be printed. For example, the first current collector 14 can be printed over the substrate 12, followed by printing of the first electrode 16 printed over the first current collector 14. Then the separator 18 can be printed over the first electrode 16, and the second electrode can be printed over the separator 18. Subsequently, the second current collector 22 can be printed over the second electrode 20.

In some embodiments, the energy storage device 10 can be partially printed. For example, one or more of the first current collector 14, the separator 18, and the second current collector 22 may not be printed. For example, one or more of the first current collector 14 and the second current collector 22 may not be printed. In some embodiments, the separator 18 is not printed. For example, at least part of the energy storage device 10 may be assembled using one or more commercially available current collectors (e.g., a metallic foil, such as an aluminum foil and/or a nickel foil) and/or commercially available separators.

The substrate 12 may comprise a variety of conductive and/or non-conductive materials. For example, a conductive substrate 12 can include graphite paper, graphene paper, aluminum (Al) foil, copper (Cu) foil, stainless steel (SS) foil, nickel (Ni), combinations thereof, and/or the like. A non-conductive substrate 12 can include polyester film, polyimide film, carbon foam, polycarbonate film, paper, coated paper (e.g., plastic coated paper), fiber paper, cardboard, combinations thereof, and/or the like.

In some embodiments, the electrolyte for an energy storage device comprises one or more ionic liquids and/or one or more conductive additives. For example, the energy storage device, such as a primary silver-containing battery or a secondary silver containing battery, may be fabricated using an electrolyte comprising one or more ionic liquids selected to facilitate desired electrical performances and/or desired interaction with one or more other components of the energy storage device. Use of electrolytes comprising one or more ionic liquids in place of traditional electrolytes, for example electrolytes comprising aqueous solutions of alkali metal hydroxides, can provide one or more of numerous advantages. Electrolytes comprising ionic liquids can be less chemically aggressive than and/or less volatile, for example as compared to aqueous alkaline-based electrolytes. Less chemically aggressive electrolytes and/or less volatile electrolytes can facilitate manufacturing of the energy storage device, for example reducing or eliminating procedures and/or tools for handling corrosive and/or volatile materials. Reduced volatility may reduce or eliminate particular sealing processes in the manufacturing of the energy storage device for reducing or eliminating evaporation of the electrolyte during fabrication, transport, and/or storage of the energy storage device. Less corrosive electrolytes may reduce or eliminate use of special tools for handling chemically corrosive materials. Less chemically aggressive and/or less volatile electrolytes may facilitate printing of the energy storage device, for example such that at least one layer, some layers, most layers, or all layers of the energy storage device may be printed (e.g., such that current collectors, electrodes and the separator are printed). A fully printed energy storage device may facilitate simplification of the manufacturing process, such as simplifying incorporation of manufacturing processes for each layer into a roll-to-roll process, reducing the costs of device fabrication.

Some ionic liquids may be unsuitable for silver-containing batteries. For example, a silver-containing battery fabricated using an unsuitable ionic liquid may not provide desired electrical and/or lifetime performances, such as failing to provide an energy storage device which can operate at desired operating voltages. A silver-containing battery (e.g., a battery having a cathode comprising silver oxide) fabricated using an electrolyte comprising one or more of the following ionic liquids may provide an operating voltage of less than about 1.1 V: 1-ethyl-3-methylimidazolium bis(trifluoromethylsulfonyl)imide; 1-ethyl-3-methylimidazolium tetrafluoroborate; 1-ethyl-3-methylimidazolium triflate; 1-methyl-3-propylimidzolium phosphate; 1-butyl-1-methylpyrrolidinium tris(pentafluoroethyl)trifluorophosphate; 1-butyl-1-methylpyrrolidinium bis(trifluoromethylsulfonyl)imide; diethylmethylsulfonium bis(trifluoromethylsulfonyl)imide; 1-ethyl-3-methylimidazolium ethylsulfate; 1-methyl-1-propylpiperidinium bis(trifluoromethylsulfonyl)imide; 1-ethyl-3-methylimidazolium tetracyanoborate; and 1-ethyl-3-methylpyridinium perfluorobutanesulfonate. These silver-containing batteries may be silver-oxide batteries including a cathode and anode as described herein, and fabricated using a non-printed separator (e.g., a non-printed separator comprising borosilicate glass (BSG) or at least partially dissolved regenerated cellulose, such as Cellophane®), and according to one or more processes described herein.

Suitable ionic liquids for an energy storage device (e.g., for a primary or secondary silver containing battery) can be selected to provide various desired characteristics, including for example desired ionic conductivity, rate of ionic dissociation, stability across operation conditions of the energy storage device, and/or chemical compatibility with one or more other components of the energy storage device. As described in more detail herein, one or more ionic liquids of an electrolyte may be selected to facilitate desired interaction with one or more components of an energy storage device separator. In some embodiments, a suitable electrolyte can have an ionic conductivity between about 0.1 milli-Siemens per centimeter (mS/cm) to about 200 mS/cm (e.g., at room temperature, such as at a temperature of about 25° C.). For example, the energy storage device may include an electrolyte having an ionic conductivity between about 1 mS/cm to about 100 mS/cm, including about 1 mS/cm to about 50 mS/cm.

In some embodiments, components of the electrolyte (e.g., the one or more ionic liquids and/or conductive additives of the electrolyte) of the energy storage device are selected to facilitate a desired energy storage device operating voltage, capacity, resistance, and/or lifetime performance. In some embodiments, the electrolyte is selected to facilitate operation of the energy storage device at an operating voltage of greater than about 1.1 V, for example, from about 1.1 V to about 1.5 V. For example, one or more ionic liquids of the electrolyte may be selected to facilitate providing an energy storage device with a desired electrical and/or lifetime performance (e.g., operation of the energy storage device at a desired operating voltage).

In some embodiments, a suitable ionic liquid can be a basic ionic liquid. In some embodiments, a suitable ionic liquid comprises an anion selected from: methanesulfonate, methylsulfate, acetate, and fluoroacetate.

In some embodiments, suitable ionic liquids comprise one or more cations including a imidazolium, pyridinium, ammonium, piperidinium, pyrrolidinium, sulfonium, and/or phosphonium. In some embodiments, an ionic liquid can include a cation comprising: butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, diethylmethylsulfonium, combinations thereof, and/or the like.

A silver-containing battery (e.g., a battery having a cathode comprising silver oxide) fabricated using one or more of the following ionic liquids can provide an operating potential of between about 1.1 V and about 1.3 V: 1-ethyl-3-methylimidazolium acetate and 1-ethyl-3-methylimidazolium trifluoroacetate. A silver-containing battery fabricated using one or more of the following ionic liquids can provide operating voltage values higher than or equal to about 1.3 V: tributyl(tetradecyl)phosphonium methansulfonate (e.g., the silver oxide battery may provide an operating voltage of about 1.4 V); 1-butyl-3-methylimidazolium methansulfonate (e.g., the silver oxide battery may provide an operating voltage of about 1.5 V); 1-ethyl-3-methylimidazolium methanesulfonate (e.g., the silver oxide battery may provide an operating voltage of about 1.35 V); 1-ethyl-3-methylimidazolium methylsulfate (e.g., the silver oxide battery may provide an operating voltage of about 1.5 V). These silver-containing batteries may be silver-oxide batteries including a cathode and anode as described herein, and fabricated using a non-printed separator (e.g., a non-printed separator comprising BSG or at least partially dissolved regenerated cellulose, such as Cellophane®), and according to one or more processes described herein.

Without being limited by any particular theory or mode of operation, a cation having a relatively short saturated aliphatic carbon chain may facilitate ionic dissociation, facilitating improved energy storage device performance. Without being limited by any particular theory or mode of operation, an increase in a length of a carbon chain of an ionic liquid can be proportional to a viscosity of a mixture comprising the ionic liquid, and viscosity of the mixture comprising the ionic liquid can be inversely proportional to conductivity of the mixture such that a reduction in the length of a carbon chain of an ionic liquid may increase conductivity of a mixture comprising the ionic liquid. For example, the 1-ethyl-3-methylimidazolium cation may be suitable for a silver-containing battery due, at least in part, to its relatively short saturated aliphatic carbon chain, providing a reduced viscosity and an increased ionic conductivity.

As described herein, an energy storage device can include a mixture of ionic liquids selected to provide desired energy storage device electrical performances and/or to facilitate fabrication of the energy storage device. For example, an ionic liquid having a methanesulfonate anion may facilitate operation of an energy storage device at relatively higher operating voltages and/or provide relatively high capacity performance. For example, a silver-oxide zinc battery with an electrolyte comprising an ionic liquid having the methanesulfonate anion (e.g., 1-ethyl-3-methylimidazolium methanesulfonate, with an ionic conductivity of about 0.26 Siemens per meter (S/m) at room temperature, such as at about 25° C.) can have an operating voltage of about 1.35 V. An ionic liquid having an acetate anion may facilitate fabrication of a separator for the energy storage device (e.g., dissolution of cellulose for fabricating a cellulose-containing separator membrane, as described in further detail herein). For example, 1-ethyl-3-methylimidazolium acetate (e.g., having an ionic conductivity of about 0.25 S/m at room temperature, such as at about 25° C.) may facilitate effective dissolution of cellulose, while a silver-oxide zinc battery using an electrolyte comprising 1-ethyl-3-methylimidazolium acetate may provide a relatively lower operating voltage of about 1.2 V and/or a relatively lower capacity performance (e.g., as compared to a silver-oxide zinc battery having an electrolyte comprising 1-ethyl-3-methylimidazolium methanesulfonate). An ionic liquid comprising a methylsulfate anion (e.g., 1-ethyl-3-methylimidazolium methylsulfate, with an ionic conductivity of about 0.6 S/m at room temperature, such as at about 25° C.) may facilitate operation of an energy storage device at relatively higher operating voltages. In some embodiments, an energy storage device can be fabricated using a mixture of ionic liquids comprising two or more of methanesulfonate, acetate, and methylsulfate anions, for example selected to provide certain energy storage device electrical performances and/or to facilitate fabrication of the energy storage device.

In some embodiments, the electrolyte can include one or more organic solvents and/or one or more salts, which can increase electrolyte ionic conductivity. In some embodiments, addition of the one or more organic solvents and/or one or more salts to the ionic liquid can facilitate an increase of the ionic conductivity of the electrolyte by up to about 10 times to about 50 times.

In some embodiments, the electrolyte is a binary or ternary mixture. For example, an energy storage device, such as a primary or secondary silver-containing battery, may include an electrolyte comprising a mixture of one or more ionic liquids, one or more organic solvents, and/or one or more salts. In some embodiments, the electrolyte includes more than one ionic liquid. In some embodiments, the electrolyte includes more than one organic solvent and/or more than one salt. In some embodiments, the electrolyte can include about 0.1 weight % to about 10 weight % of one or more organic solvents. In some embodiments, the electrolyte can include about 0.1 weight % to about 5 weight % of one or more salts.

In some embodiments, suitable organic solvents for electrolytes may have desired stability under operating conditions of the energy storage device (e.g., desired thermal, chemical, and/or electrochemical stability under operating voltages of the energy storage device). Suitable organic solvents may facilitate increased ionic dissociation of one or more ionic liquids of the electrolyte. In some embodiments, organic solvents for electrolytes have desired evaporation temperatures to reduce undesired evaporation during fabrication of the energy storage device.

Examples of suitable organic solvent additives for the electrolyte may comprise one or more of: ethers (e.g., diethyl ether, tetrahydrofuran, 2-methyltetrahydrofuran, diethoxyethane, 1,3-dioxolane); esters (e.g., methyl formate, gamma-butyrolactone, methyl acetate); alkyl carbonates (e.g., dimethyl carbonate, ethylene carbonate, diethyl carbonate, propylene carbonate, ethyl methyl carbonate); nitriles (e.g., adiponitrile, acetonitrile, glutaronitrile); combinations thereof; and/or the like.

Examples of suitable salt additives for the electrolyte may comprise one or more of organic or inorganic salts having a cation comprising lithium, zinc, cadmium, nickel, aluminum, silver, cobalt, combinations thereof, and/or the like. In some embodiments, the salt additive can include an anion that is the same as an anion of an ionic liquid of the electrolyte. Examples of anions for suitable salt additives of the electrolyte may comprise tris(pentafluoroethyl)trifluorophosphate, trifluoromethanesulfonate, hexafluorophosphate, tetrafluoroborate, ethyl sulfate, dimethyl phosphate, trifluoromethanesulfonate, methanesulfonate, triflate, tricyanomethanide, dibutylphosphate, bis(trifluoromethylsulfonyl)imide, bis-2,4,4-(trimethylpentyl) phosphinate, iodide, chloride, bromide, nitrate, methanesulfonate, methylsulfate, acetate, fluoroacetate, combinations thereof, and/or the like.

Suitable current collectors (e.g., the first current collector 14 and/or the second current collector 22 of the energy storage device 10 in FIG. 1) can comprise one or more electrically conductive materials. In some embodiments, a current collector is non-printed. For example, a non-printed current collector may comprise a metallic foil, including an aluminum (Al) foil, a nickel (Ni) foil, combinations thereof, and/or the like. In some embodiments, a current collector is printed. In some embodiments, a printed current collector comprises nickel. Examples of nickel-containing printed current collectors are provided in PCT Patent Application No. PCT/US2013/078059, filed Dec. 27, 2013, which is hereby incorporated herein by reference in its entirety. In some embodiments, a printed current collector comprises a plurality of diatom frustules (e.g., including conductive coatings and/or features). Examples of printed current collectors comprising diatom frustules are provided in U.S. patent application Ser. No. 14/161,658, filed Jan. 22, 2014, which is hereby incorporated herein by reference in its entirety.

In some embodiments, one or more electrodes of an energy storage device are printed (e.g., the first electrode 16 and/or the second electrode 20 of energy storage device 10 in FIG. 1). Referring again to FIG. 1, in some embodiments, both the first electrode 16 and the second electrode 20 are printed. One of the first electrode 16 and the second electrode 20 may comprise an energy storage device cathode, and the other of the first electrode 16 and the second electrode 20 may comprise an energy storage device anode. One or both of the cathode and the anode may comprise an electrode active component, an electrolyte, a conductive additive, and/or a polymer binder. In some embodiments, the electrode active component and/or conductive additive can have particle sizes configured to facilitate incorporation into the electrode such that the electrode can be printed. In some embodiments, particles of the conductive additive and/or electrode active component can have a diameter and/or a longest dimension less than or equal to about 30 µm.

The cathode of an energy storage device may include an electrode active component for an energy storage device cathode, such as a silver-containing component. For example, the cathode may include a silver(I) oxide ($Ag_2O$), a silver(I,III) oxide (AgO), a mixture comprising silver(I) oxide ($Ag_2O$) and manganese(IV) oxide ($MnO_2$), a mixture comprising silver(I) oxide ($Ag_2O$) and nickel oxyhydroxide (NiOOH), silver nickel oxide ($AgNiO_2$), combinations thereof, and/or the like. The anode may include an electrode active component for an energy storage device anode, such as zinc, cadmium, iron, nickel, aluminum, metal hydrate, hydrogen, combinations thereof, and/or the like. In some embodiments, the anode can include zinc powder.

In some embodiments, one or more of the electrodes can include a conductive additive configured to increase electrical conductivity of the electrode. The conductive additive may include a conductive carbon, such as graphite, graphene, carbon nanotubes (e.g., single-walled and/or multi-walled carbon nanotubes), combinations thereof, and/or the like. In some embodiments, the conductive additive includes metallic powder. For example, a conductive additive for a cathode of the energy storage device can include powder (e.g., comprising flakes, particles, tubes, combinations thereof, and/or the like) comprising silver, tin (Sn), lithium (Li), cobalt (Co), nickel (Ni), titanium (Ti), chromium (Cr), iron (Fe), manganese (Mn), ruthenium (Ru), combinations thereof, and/or the like.

In some embodiments, one or more of the electrodes can include a polymer binder. Suitable polymers for a binder can be selected based on one or more desired characteristics, such as demonstrated chemical, thermal, and/or electrochemical stability under operating conditions of the energy storage device (e.g., an operating voltage of the energy storage device). In some embodiments, suitable polymer binders can include one or more fluorinated polymers. For example, fluorinated polymers may demonstrate desired chemical, thermal, and/or electrochemical stability under an operating voltage of the energy storage device.

A polymer binder and/or a precursor for the polymer binder may comprise: polyvinyl pyrrolidone (PVP), polyvinyl alcohol (PVA), polyvinylidene fluoride, polyvynylidene fluoride-trifluoroethylene, polytetrafluoroethylene, poly-dimethylsiloxane, polyethelene, polypropylene, polyethylene oxide, polypropylene oxide, polyethylene glycol-hexafluoropropylene, polyethylene terephthalate, polyacrylonitrile, polyvinyl butyral, polyvinylcaprolactam, polyvinyl chloride; polyimide polymers and copolymers (including aliphatic, aromatic and semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organomodified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, chitosan, combinations thereof, and/or the like.

As described herein, one or more electrodes of the energy storage device may be printed. Inclusion of solvent in an ink used to print the one or more electrodes may facilitate printing of the one or more electrodes. In some embodiments, suitable solvents may have relatively high boiling points, for example to facilitate reduced evaporation rate of inks formulated using the solvent. Reduced evaporation rate of inks may reduce solvent loss during ink fabrication, printing of the ink and/or during storing of the ink mixtures. In some embodiments, solvent remaining in printed ink can be evaporated during a drying process (e.g., a curing process) subsequent to printing of the ink. For example, all or substantially all of the solvent in an ink used for printing an electrode may be evaporated in the electrode fabrication process such that no or a negligible amount of solvent remains in the finished printed electrode layer.

A solvent for one or more electrodes of the energy storage device may comprise: water, alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; lactones such as butyl lactone; ethers such as methyl ethyl ether, diethyl ether, ethyl propyl ether, and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, n-butyl acetate, dimethyl adipate, proplyene glycol monomethyl ether acetate, dimethyl glutarate, dimethyl succinate, glycerin acetate, carboxylates; carbonates such as propylene carbonate; polyols (or liquid polyols), glycerols and other polymeric polyols or glycols such as glycerin, diol, triol, tetraol, pentaol, ethylene glycols, diethylene glycols, polyethylene glycols, propylene glycols, dipropylene glycols, glycol ethers, glycol ether acetates 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol; tetramethyl urea, n-methylpyrrolidone, acetonitrile, tetrahydrofuran (THF), dimethyl formamide (DMF), N-methyl formamide (NMF), dimethyl sulfoxide (DMSO); thionyl chloride; sulfuryl chloride; cyclohexanone, dimethyl acetamide, dimethyl sulfoxide, triethyl phosphate, isophorone, combinations thereof, and/or the like.

Listed below are examples of compositions, by weight %, of inks for printing electrodes of the energy storage device.

Examples of compositions for inks used in printing a silver-containing cathode:
- Silver (I) Oxide ($Ag_2O$)—about 30 wt % to about 80 wt %
- Graphite—about 0.5 wt % to about 10 wt %
- Polyvinylidene fluoride (PVDF, for example, Kynar® HSV 900 grade PVDF)—about 0.2 wt % to about 5 wt %
- Solvent (e.g., tetramethyl urea, n-methylpyrrolidone and/or triethylphosphate)—about 30 wt % to about 70 wt %

Examples of compositions for inks used in printing a zinc-containing anode:
- Zinc (e.g., zinc dust)—about 55 wt % to about 85 wt %
- Electrolyte (e.g., 1-ethyl-3-methylimidazolium methanesulfonate, and/or one or more other ionic liquids)—about 0.1 wt % to about 10 wt %
- Polyvinyl alcohol (PVA, e.g., PVA having a molecular weight of about 6000 Daltons (Da) and/or about 13000 Da) and/or Polyvinylidene fluoride (PVDF, for example, Kynar® HSV 900 grade PVDF)—about 2 wt % to about 5 wt %
- Solvent (e.g., n-methylpyrrolidone)—about 10 wt % to about 40 wt %

Listed below are examples of compositions, in weight %, of electrodes printed using the above-listed ink compositions.

Examples of compositions for a printed silver containing cathode:
- Silver (I) Oxide ($Ag_2O$)—about 60 wt % to about 95 wt %
- Graphite—about 3 wt % to about 20 wt %
- Polyvinylidene fluoride (PVDF, for example, Kynar® HSV 900 grade PVDF)—about 0.3 wt % to about 6 wt %

Examples of compositions for a printed zinc containing anode:
- Zinc (e.g., zinc dust)—about 75 wt % to about 98 wt %
- Electrolyte (e.g., 1-ethyl-3-methylimidazolium methanesulfonate, and/or one or more other ionic liquids)—about 0.15 wt % to about 7 wt %
- Polyvinyl alcohol (PVA, e.g., PVA having a molecular weight of about 6000 Daltons (Da) and/or about 13000 Da) and/or Polyvinylidene fluoride (PVDF, for example, Kynar® HSV 900 grade PVDF)—about 2 wt % to about 6 wt %

A suitable separator of the energy storage device can be permeable to ions of the electrolyte, allowing ionic transport between electrodes of the energy storage device, while facilitating electrical insulation between the electrodes, including for example by providing physical separation between the electrodes of the energy storage device. The separator may comprise a porous material chemically compatible with the energy storage device electrolyte and configured to permit ions to pass therethrough while preventing electrode active particles from migrating from one electrode to another. In some embodiments, the separator can be made of a material configured to be capable of absorbing a sufficient quantity of electrolyte, for example, such that there is sufficient electrolyte to facilitate desired ionic transport between electrodes of the energy storage device.

In some embodiments, the separator of an energy storage device can be configured to inhibit or prevent active-particle containing growths in one electrode of the energy storage device from electrically shorting the energy storage device. For example, a zinc-containing dendrite may form in zinc-containing anode of the energy storage device during operation of the energy storage device, such as during a charging process of the energy storage device. The separator may be configured to inhibit or prevent the zinc dendrite from physically contacting a cathode of the energy storage device, so as to inhibit or prevent electrical shorting of the energy storage device. In some embodiments, the separator can be configured to inhibit or prevent migration of active electrode ions and/or nanoparticles (e.g., nanoparticles having a diameter and/or longest dimension between about 10 nanometers (nm) to about 50 nm) from one electrode to the other, such as the migration of silver ions and/or nanoparticles from a silver-containing cathode to the anode of the energy storage device (e.g., a zinc-containing anode of the energy storage device).

An energy storage device may include a printed or non-printed separator. In some embodiments, a non-printed separator may be made from one or more synthetic polymer membranes. In some embodiments, a non-printed separator can comprise cellulose (e.g., at least partially dissolved Cellophane®), polyamide (e.g., nylon), polyolefin (e.g., a polypropylene, radiation-grafted polyethylene), fibrous sausage casing, combinations thereof, and/or the like. In some embodiments, a non-printed separator can comprise one or more inorganic membranes. For example, a non-printed separator can comprise borosilicate glass, asbestos, potassium titanate fibers, zirconium oxide, combinations thereof, and/or the like.

Commercially available separator membranes may not be suitable for an energy storage device comprising a silver containing battery. It was found that the following commercially available separator membranes were unable to provide electrical insulation for an extended period of time: Celgard® polypropylene membrane 3401, Celgard® polypropylene membrane 3501, Celgard® polypropylene/polyethylene/polypropylene 2340 membrane, Celgard® polypropylene membrane 5550 membrane, nylon membrane (e.g., nylon membrane comprising pores having a size of about 0.1 µm, and having a thickness of about 30 µm), polyethersulfone membrane, and methylcellulose membrane (e.g., a methylcellulose membrane comprising pores having a size of about 0.1 µm). For example, visual signs of black colored silver oxide from a cathode of the silver containing batteries were observed on a surface of a zinc electrode after a period of charge and discharging the batteries (e.g., due to transfer of colloidal silver through the separators of the batteries by means of electrolyte before and/or during discharge of the batteries).

In some embodiments, a suitable non-printed separator can comprise borosilicate glass. For example, a separator made of borosilicate glass can have a thickness sufficient to prevent migration of silver ions from a silver containing cathode of a silver containing battery to the anode of the silver containing battery, and/or migration of electrode active particles between the electrodes of the silver containing battery.

Figure 2:
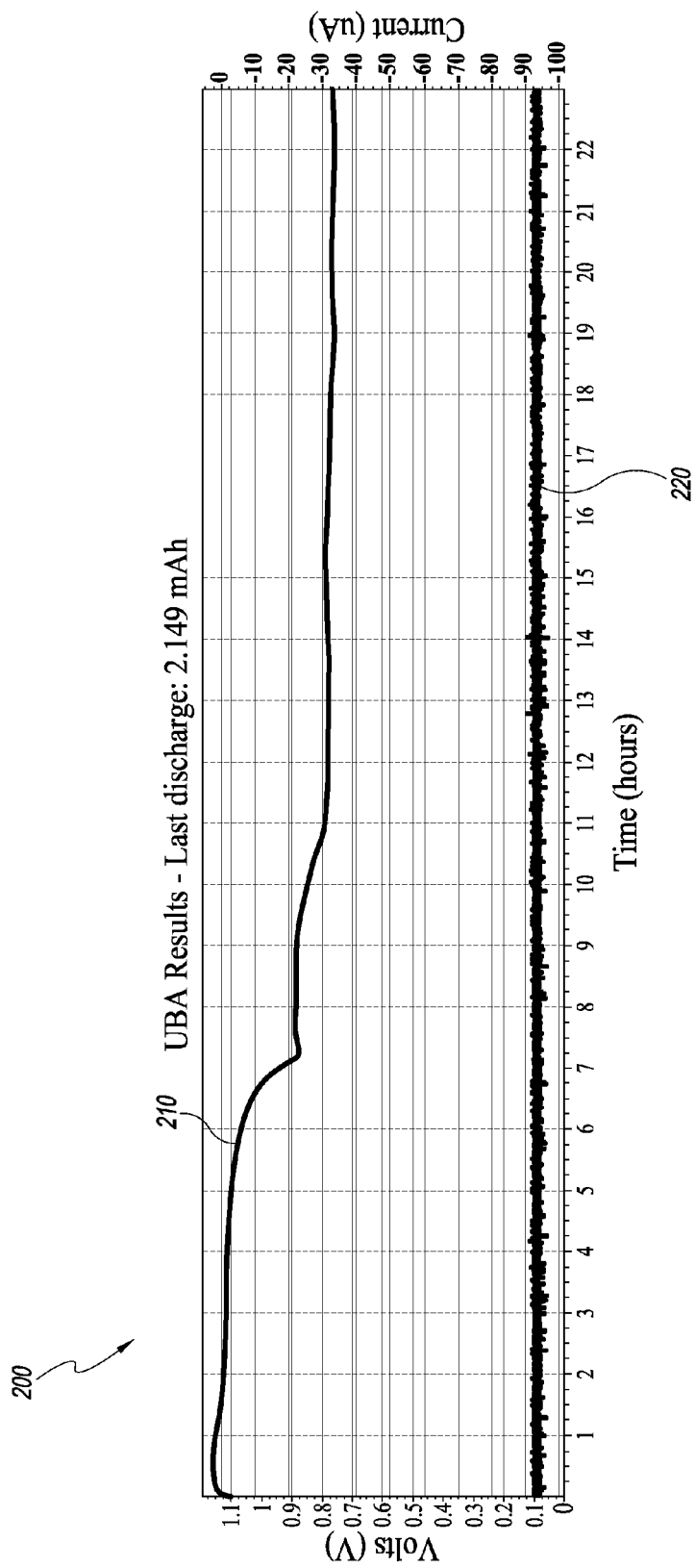
FIG. 2 is a graph of a battery potential versus time of discharge for an example of an energy storage device, according to one embodiment.

FIG. 2 is a graph 200 of an energy storage device potential versus time of discharge curve 210, showing the potential performance V of the energy storage device versus time in hours, where the energy storage device is discharged with a constant or substantially constant current, as shown by constant current curve 220. The energy storage device corresponding to the graph of FIG. 2 was a partially printed silver-oxide battery in a shape of a square having sides measuring about 0.5 in by 0.5 in. For example, the energy storage device had a printed first current collector, printed second current collector, printed cathode, printed anode, and a non-printed separator comprising borosilicate glass between the printed cathode and the printed anode. The cathode of the silver-oxide battery included a mass of silver-oxide of about 0.033 g, and the energy storage included a zinc-containing anode having a quantity of zinc in stoichiometric excess to the silver. The energy storage device included an electrolyte comprising 1-ethyl-3-methylimidazolium methanesulfonate. The separator included a borosilicate glass layer having a thickness sufficient to inhibit or prevent migration of silver ions from the cathode comprising the silver-oxide to the anode comprising the zinc and migration of nanoparticles between the electrodes. The borosilicate glass separator of the silver-oxide battery used for the test of FIG. 2 had a thickness of about 1 mm, although other thicknesses (e.g., greater than or equal to about 1 mm) are also possible.

Referring to FIG. 2, the energy storage device comprising the borosilicate glass-containing separator had an initial voltage of about 1.348 V. The energy storage device was discharged at a constant current of about −100 microamperes (μA), as shown by the constant current curve 220. The energy storage device demonstrated an average operating voltage of about 0.9 V, and a capacity of about 2.149 mAh. The battery demonstrated an average resistance value of about 2.8 kΩ. The voltage of the energy storage device after 23 hours, when the testing was stopped, was about 0.76 V.

Silver oxide batteries using a borosilicate glass separator and an electrolyte comprising the 1-ethyl-3-methylimidazolium cation and an anion comprising methylsulfate, acetate, or fluoroacetate may also be feasible. For example, a partially printed silver oxide battery using a borosilicate glass separator and having an electrolyte comprising 1-ethyl-3-methylimidazolium methylsulfate may provide an initial potential of about 1.45 V.

In some embodiments, the separator comprises cellulose. Use of cellulose separator in an energy storage device may facilitate disposal of the energy storage device due to the biodegradability and/or non-toxicity of cellulose. A suitable cellulose based separator can be printed or non-printed.

In some embodiments, a non-printed separator comprises at least partially dissolved cellulose soaked and/or immersed in one or more ionic liquids (e.g., the separator may comprise one or more ionic liquids and may be made by partially dissolving regenerated cellulose, such as Cellophane®, using the one or more ionic liquids). For example, the non-printed separator may have a gel-like structure, comprising the at least partially dissolved regenerated cellulose soaked and/or immersed in the one or more ionic liquids selected to provide the desired dissolution effect upon the regenerated cellulose. Untreated regenerated cellulose (e.g., Cellophane®) may be commercially available (e.g., for example a Cellophane® film having a thickness of about 25 μm from Innovia Films Inc., of Atlanta, Ga., USA) and may have a variety of suitable thicknesses (e.g., a thickness of about 1 μm to about 1 mm). Subsequently, the regenerated cellulose may be soaked in a chemistry comprising the one or more ionic liquids such that the regenerated cellulose may swell and may be at least partially dissolved, for example, facilitating formation of a gel-like structure. A partially-dissolved cellulose may advantageously be conductive of electrolytic ions, while inhibiting or preventing migration of electrode active nanoparticles from one electrode to another. At least partially dissolved cellulose material may chemically react with silver ions, so as to inhibit or prevent migration of silver ions from the silver-containing cathode of an energy storage device to the anode of energy storage device. In some embodiments, at least partially dissolved cellulose may inhibit or prevent growth of zinc dendrites in an energy storage device's zinc-containing anode. For example, the at least partially dissolved cellulose may decelerate growth of zinc dendrites in a secondary silver-zinc battery.

Cellulose can be difficult to dissolve and may be insoluble in water and/or in many organic solvents. Without being limited by any particular theory or mode of operation, it is believed that the difficulty in dissolving cellulose may be attributed, at least in part, to its hydrogen bonds and/or partially crystalline structure. According to some embodiments, a chemistry used in soaking the cellulose comprises one or more ionic liquids selected to facilitate weakening or breaking of the hydrogen bonds, and/or weakening or breaking of the partially crystalline structure. In some embodiments, the soaking chemistry is compatible with the energy storage device electrolyte chemistry, and/or with one or more other components of the energy storage device. In some embodiments, the energy storage device electrolyte comprises one or more components of the soaking chemistry. For example, components of the soaking chemistry may also serve as the electrolyte of the energy storage device. In some embodiments, the non-printed separator can have a gel-like structure comprising the at least partially dissolved cellulose and the energy storage device electrolyte, where the electrolyte can have a composition which includes one or more components of the soaking chemistry (e.g., the electrolyte can have the same composition as the soaking chemistry).

As described herein, a suitable chemistry may comprise one or more ionic liquids capable of at least partially dissolving the cellulose. Many ionic liquids may demonstrate unsatisfactory ability in dissolving cellulose. A suitable ionic liquid can include one or more anions conducive to weakening or breaking the hydrogen bonds of the cellulose, and/or weakening or break of the partially crystalline structure. Ionic liquids having a chloride anion and/or an acetate anion may demonstrate desired capability of dissolving cellulose. In some embodiments, suitable chemistry for soaking cellulose can include one or more ionic liquids comprising a methanesulfonate anion, a bromide anion, and/or a formate anion.

Parameters of a process of soaking the regenerated cellulose can be selected such that the cellulose can be sufficiently dissolved while still maintaining desired structural and/or chemical integrity. Regenerated cellulose which is insufficiently dissolved may not provide desired ionic conductivity, while overly dissolved regenerated cellulose can be structurally and/or chemically unstable during operation of energy storage device. For example, a temperature, pressure, and/or duration of a process for soaking regenerated cellulose can be selected to facilitate a desired degree of dissolution of the cellulose. In some embodiments, the regenerated cellulose can be soaked in a soaking chemistry comprising one or more ionic liquids at a temperature of about 90° C. to about 110° C., for a duration of about 5 min to about 30 min, and at atmospheric pressure (e.g., under a pressure of about 1 atm). For example, regenerated cellulose may be soaked in a soaking chemistry comprising one or more ionic liquids for a duration of about 10 min and in a temperature of about 100° C., under atmospheric pressure (e.g., under a pressure of about 1 atm), such that the cellulose is sufficiently dissolved while still maintaining desired physical and/or chemical integrity so as to be sufficiently stable as a separator layer to provide electrical insulation for an energy storage device and provide desired ionic conductivity between electrodes and separator of the energy storage device.

Figure 3:
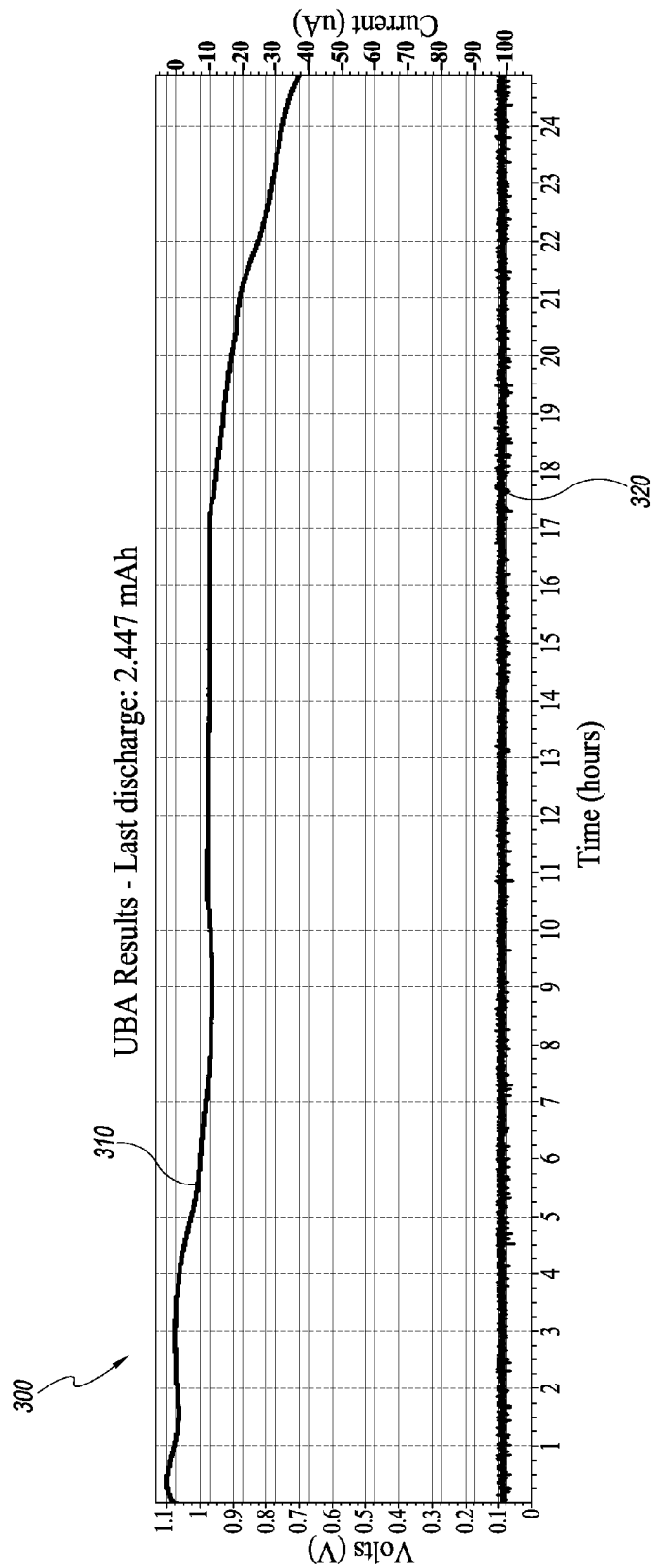
FIG. 3 is a graph of a battery potential versus time of discharge of an example of an energy storage device, according to another embodiment.

FIG. 3 is a graph 300 of an energy storage device potential versus time of discharge curve 310, showing the potential performance in V of the energy storage device versus time in hours, where the energy storage device is discharged with a constant or substantially constant current, as shown by constant current curve 320. The energy storage device corresponding to FIG. 3 was a partially printed silver-oxide battery comprising a cathode which included a mass of silver-oxide of about 0.21 g, and a zinc-containing anode having a quantity of zinc in stoichiometric excess. The energy storage device had a square or substantially square shape, where sides of the square were about 0.5 in by about 0.5 in. The energy storage device included a printed first current collector, printed second current collector, printed cathode, printed anode, and a non-printed separator. The separator was made using regenerated cellulose in the form of Cellophane®. A regenerated cellulose film having a thickness of about 25 μm was soaked in a soaking chemistry comprising 1-ethyl-3-methylimidazolium methanesulfonate for a duration of about 10 min, at a temperature of about 100° C. and at about atmospheric pressure.

The energy storage device was discharged at a constant or substantially constant current of about −100 vA, as shown by constant current curve 320. The energy storage device demonstrated an initial voltage of about 1.34 V and a capacity of about 2.447 mAh. The silver-oxide battery demonstrated an average resistance value of about 3 kΩ and an average operating voltage of about 1 V. The silver-oxide battery of FIG. 3 had a cut-off voltage of about 0.7 V, which was reached after about 25 hours. The silver-oxide battery corresponding to FIG. 3 demonstrated a 14% higher capacity (2.447 mAh) value than the silver-oxide battery corresponding to FIG. 2 (2.149 mAh).

As described herein, the soaking chemistry for the energy storage device may include one or more ionic liquids selected to provide desired dissolution effect upon the cellulose, facilitating efficient dissolution of the cellulose (e.g., one or more ionic liquids comprising an acetate anion, such as a 1-ethyl-3-methylimidazolium acetate). For example, a soaking chemistry comprising 1-ethyl-3-methylimidazolium acetate may facilitate effective dissolution of regenerated cellulose, such as providing sufficient dissolution of regenerated cellulose after a duration of about 5 minutes at a temperature of about 80° C. and under atmospheric pressure (e.g., under a pressure of about 1 atm).

In some embodiments, one or more other components may be included in the soaking chemistry (e.g., in addition to a soaking chemistry comprising the one or more ionic liquids to facilitate dissolution of cellulose, such as the 1-ethyl-3-methylimidazolium acetate) to facilitate improved electrical performance of the energy storage device and/or improved control in the dissolution of the cellulose. For example, one or more additional ionic liquids providing a weaker cellulose dissolution effect (e.g., than the one or more ionic liquids selected for providing the desired cellulose dissolution effect, such as an ionic liquid comprising the acetate anion, including 1-ethyl-3-methylimidazolium acetate) may be included to facilitate control in the dissolution of cellulose (e.g., rate, extent). A mixture comprising one or more ionic liquids selected to provide a desired cellulose dissolution effect and one or more additional ionic liquids having a weaker cellulose dissolution effect may more controllably and/or predictably dissolve the cellulose.

Ionic liquids that may have a good dissolution effect on cellulose may lack desired ionic conductivity. In some embodiments, the soaking chemistry can include one or more additional ionic liquids for facilitating desired ionic conductivity. For example, ionic liquids suitable for an electrolyte of the energy storage device may be included in the soaking chemistry. In some embodiments, the soaking chemistry can include one or more additional ionic liquids and/or one or more conductive additives to facilitate increased energy storage device voltage performance, increased energy storage device capacity, and/or reduced energy storage device resistance performance (e.g., one or more conductive additives, and/or one or more ionic liquids suitable for facilitating desired ionic conductivity between electrodes of the energy storage device). The one or more components (e.g., the one or more additional ionic liquids and/or conductive additives) configured to improve an electrical performance of the energy storage device may not be an effective solvent for regenerated cellulose, for example not providing effective dissolution of the regenerated cellulose.

In some embodiments, the plurality of ionic liquids included in the soaking chemistry can provide both improved control in cellulose dissolution (e.g., versus certain single ionic liquid chemistries) and increased ionic conductivity (e.g., versus certain single ionic liquid chemistries). For example, the soaking chemistry, in addition to 1-ethyl-3-methylimidazolium acetate, which can provide good dissolution of cellulose, can include one or more ionic liquids comprising a methylsulfate anion: 1-ethyl-3-methylimidazolium methylsulfate, which can provide good electrical performance in an energy storage device comprising a separator formed from the cellulose, such as increased ionic conductivity, increased voltage performance (e.g., increased initial voltage and/or working voltage), and/or reduced device resistance, and/or can facilitate improved control in the dissolution of the cellulose.

Figure 4:
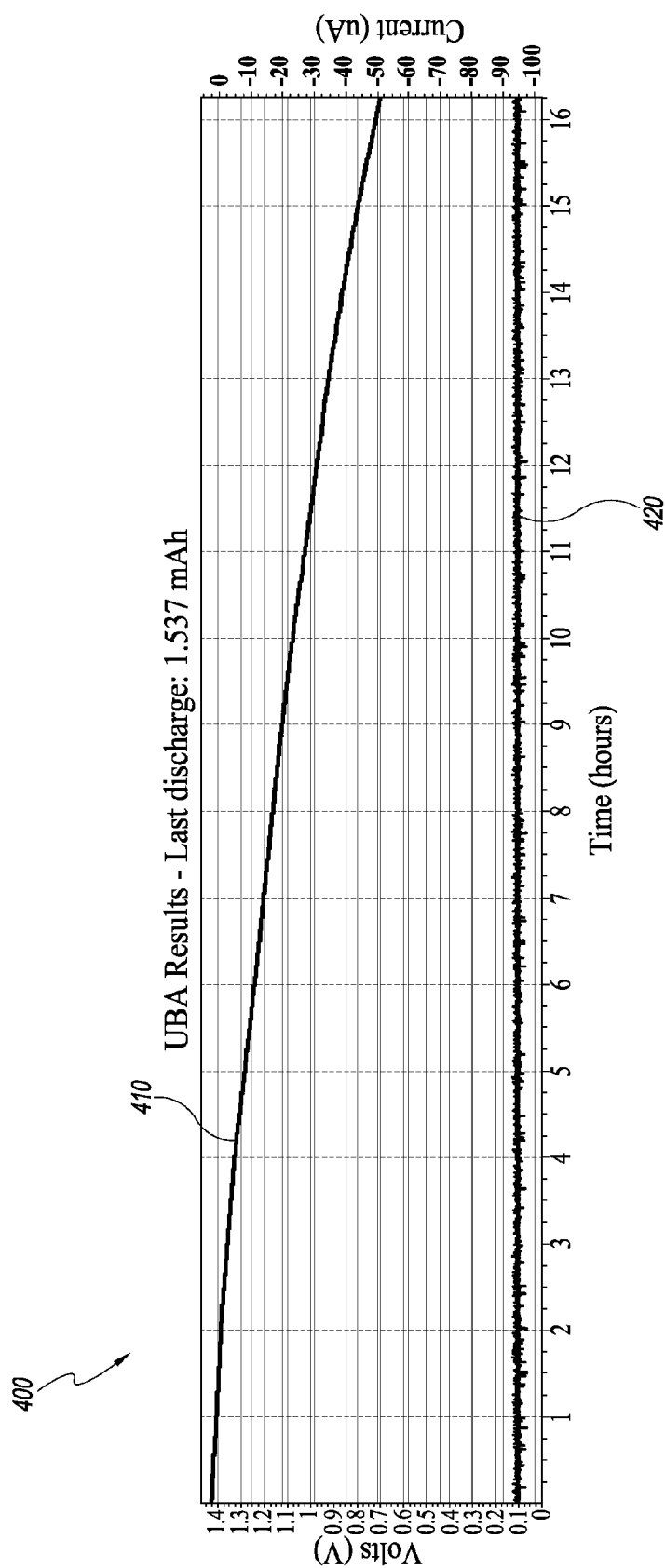
FIG. 4 is a graph of a battery potential versus time of discharge of an example of an energy storage device, according to another embodiment.

FIG. 4 is a graph 400 of an energy storage device potential versus time of discharge curve 410, showing the potential performance in V of the energy storage device versus time in hours, where the energy storage device is discharged with a constant or substantially constant current, as shown by constant current curve 420. The energy storage device corresponding to FIG. 4 was a partially silver oxide battery, comprising a printed first current collector, printed second current collector, printed cathode having a mass of silver oxide of about 0.046 g, printed zinc-containing anode having a quantity of zinc in stoichiometric excess, and a non-printed separator. The non-printed separator was made using regenerated cellulose in the form of Cellophane®. The regenerated cellulose, a Cellophane® film having a thickness of about 25 μm, was soaked using a mixture also suitable for an energy storage device electrolyte, the soaking mixture comprising an ionic liquid configured to facilitate effective dissolution of the cellulose, and one or more components configured to facilitate providing desired electrical performance for the energy storage device. The regenerated cellulose was soaked in a chemistry comprising 1-ethyl-3-methylimidazolium acetate, 1-ethyl-3-methylimidazolium methylsulfate and zinc acetate. The soaking chemistry included about 50 weight % 1-ethyl-3-methylimidazolium methylsulfate and about 50 weight % 1-ethyl-3-methylimidazolium acetate ionic liquids, and about 0.1 moles/L (M) of the zinc acetate. As described herein, 1-ethyl-3-methylimidazolium acetate can facilitate effective dissolution of the regenerated cellulose, and the 1-ethyl-3-methylimidazolium methylsulfate and/or the zinc acetate can facilitate increased ionic conductivity of the mixture (e.g., facilitating operation of the energy storage device at an increased operating potential), and/or improved control in the dissolution of the regenerated cellulose.

The energy storage corresponding to FIG. 4 had a square or substantially square shape, with sides of about 0.5 in by about 0.5 in. The energy storage device was discharged at a constant or substantially constant current of about −100 μA and had a cut-off voltage of about 0.7 V, which was reached after about 16.2 hours. The energy storage device demonstrated an initial voltage of about 1.50 V, an average operating voltage of about 1.2 V, and an average resistance performance of about 0.7 kΩ. The capacity of the energy storage device was about 1.537 mAh. The silver oxide battery of FIG. 4 demonstrated an increased average operating voltage and reduced average resistance (e.g., as compared to the silver oxide batteries of FIGS. 2 and 3). As shown in FIGS. 2-4, composition of the electrolyte may be adjusted to facilitate providing energy storage devices with desired electrical performances.

In some embodiments, the separator of an energy storage device can be printed. For example, an energy storage device first current collector, second current collector, first electrode, second electrode, and separator, may all be printed. Printing of all of the first current collector, second current collector, first electrode, second electrode, and separator may reduce costs of energy storage device fabrication, simplifying incorporation of the separator fabrication process into the fabrication process for other components of the energy storage device. For example, incorporating a separator printing process into a roll-to-roll printing process for one or more other components of the energy storage device may involve fewer processes than incorporating a non-printed separator into the energy storage device. Printing each of the first current collector, second current collector, first electrode, second electrode, and separator may facilitate increased flexibility in fabrication of electronic devices powered by the printed energy storage devices. For example, the printed energy storage device may be fabricated on a common substrate with one or more electronic devices powered by the printed energy storage device (e.g., light emitting diodes (LEDs), sound devices, memory devices, etc.). In some embodiments, the common substrate can be electrically conductive, providing electrical communication between the printed energy storage device and the electronic device(s) powered by the printed energy storage device. In some embodiments, the common substrate can be electrically insulating, and one or more electrical communication wires can be printed on the electrically insulating substrate for coupling the printed energy storage device to the electronic device(s) powered by the printed energy storage device. Printed separators may advantageously demonstrate improved adhesion of the separator to one or more adjacent energy storage device components (e.g., adjacent electrode layers). In some embodiments, printed separators can facilitate improved electrical performance for the energy storage device, such as facilitating reduced resistance values, increased capacitor performance, and/or increased voltage values. Without being limited by any particular theory or mode of operation, improved adhesion of the separator to one or more adjacent components may facilitate improved electrical performance of the energy storage device, such as a reduced resistance value, increased voltage value, and/or increased capacity value.

In some embodiments, a printed separator comprises dissolved cellulose. Cellulose powder of one or more of the following may be dissolved for the fabrication of a printed separator, such as cellulose powder from lignin, cotton, rayon, regenerated cellulose, α-cellulose, wood, xylan, lyocell, bagasse, combinations thereof, and/or the like. The cellulose powder may be dissolved in a chemistry comprising one or more ionic liquids. Dissolution of the cellulose powder may be performed according to one or more processes described herein for the dissolution of regenerated cellulose. For example, one or more processes described herein for partial dissolution of regenerated cellulose may be performed for a longer duration and/or at a higher temperature to provide fully dissolved cellulose powder. In some embodiments, the cellulose powder can be pretreated prior to subjecting the cellulose powder to the dissolution chemistry to facilitate the dissolution of the cellulose powder. For example, the cellulose powder may undergo one or more pretreatment processes to facilitate breaking apart of the cellulose powder particles, and/or cleaving of polymer chains of the cellulose powder. In some embodiments, the pretreatment includes mechanical milling of the cellulose powder, applying microwave radiation to the cellulose powder, applying ultrasonic radiation to the cellulose powder, combinations thereof, and/or the like.

In some embodiments, the dissolved cellulose powder can be combined with an organic solvent to facilitate formation of a printable ink solution using the dissolved cellulose powder. Cellulose dissolved at increased temperatures (e.g., at temperatures higher than room temperature, such as about 25° C.) may precipitate and/or recrystallize when cooled, such as to room temperature. In some embodiments, one or more organic solvents may be added to facilitate providing dissolved cellulose at room temperature, so as to provide printable ink solutions at room temperature. In some embodiments, suitable organic solvents which can facilitate formation of printable ink solution at room temperature can include polar aprotic organic solvents. In some embodiments, suitable organic solvents can include triethanolamine, ethylenediamine, pentylamine, N-Methylmorpholine N-oxide, dimethylacetamide, dimethylsulfoxide, tetrabutylammonium fluoride trihydrate, combinations thereof, and/or the like.

The organic solvent may be removed subsequent to printing of the ink solution. In some embodiments, a printed separator comprising cellulose can have a structure similar to that of a non-printed separator comprising cellulose prepared according to one or more processes described herein. For example, the printed separator comprising the cellulose may have a gel-like structure, and may comprise the dissolved cellulose and an energy storage device electrolyte, where the electrolyte can include one or more components of a chemistry used in dissolving the cellulose (e.g., one or more ionic liquids used in dissolving the cellulose).

In some embodiments, a printed separator can include a plurality of particles configured to provide structural support for the separator. The printed separator may include solid and/or hollow particles configured to provide structural support for the separator. The solid or hollow particles may have a spherical or substantially spherical shape. The plurality of particles may be made from non-conductive materials, such as glass, alumina, silica, polystyrene, melamine, combinations thereof, and/or the like. In some embodiments, the plurality of particles can have a size to facilitate printing of an ink which incorporates the particles, for example the particles having a diameter or longest dimension of about 0.1 μm to about 50 μm. Examples of printed separators are provided in U.S. patent application Ser. No. 13/571,308, filed Aug. 9, 2012, which is hereby incorporated herein in its entirety.

Examples of ink compositions, in weight %, for a printed separator are provided below.

- Electrolyte (e.g., 1-ethyl-3-methylimidazolium methanesulfonate and/or other ionic liquids)—about 10 wt % to about 40 wt % Polyvinylidene fluoride (PVDF, for example, Kynar Flex® 2801 grade PVDF, and/or Kynar® ADX PVDF)—about 5 wt % to about 30 wt %
- Solvent (e.g., tetramethyl urea, n-methylpyrrolidone and/or triethylphosphate)—about 30 wt % to about 85 wt %
- Particles for structural support—up to about 45 wt %

Examples of compositions, in weight %, of printed separators using the above-listed compositions are provided below.

- Electrolyte (e.g., 1-ethyl-3-methylimidazolium methanesulfonate and/or other ionic liquids)—about 30 wt % to about 70 wt % electrolyte;
- Polyvinylidene fluoride (PVDF, for example, Kynar Flex® 2801 grade PVDF, and/or Kynar® ADX PVDF)—about 30 wt % to about 70 wt %
- Particles for structural support—up to about 60 wt %

Figure 5A:
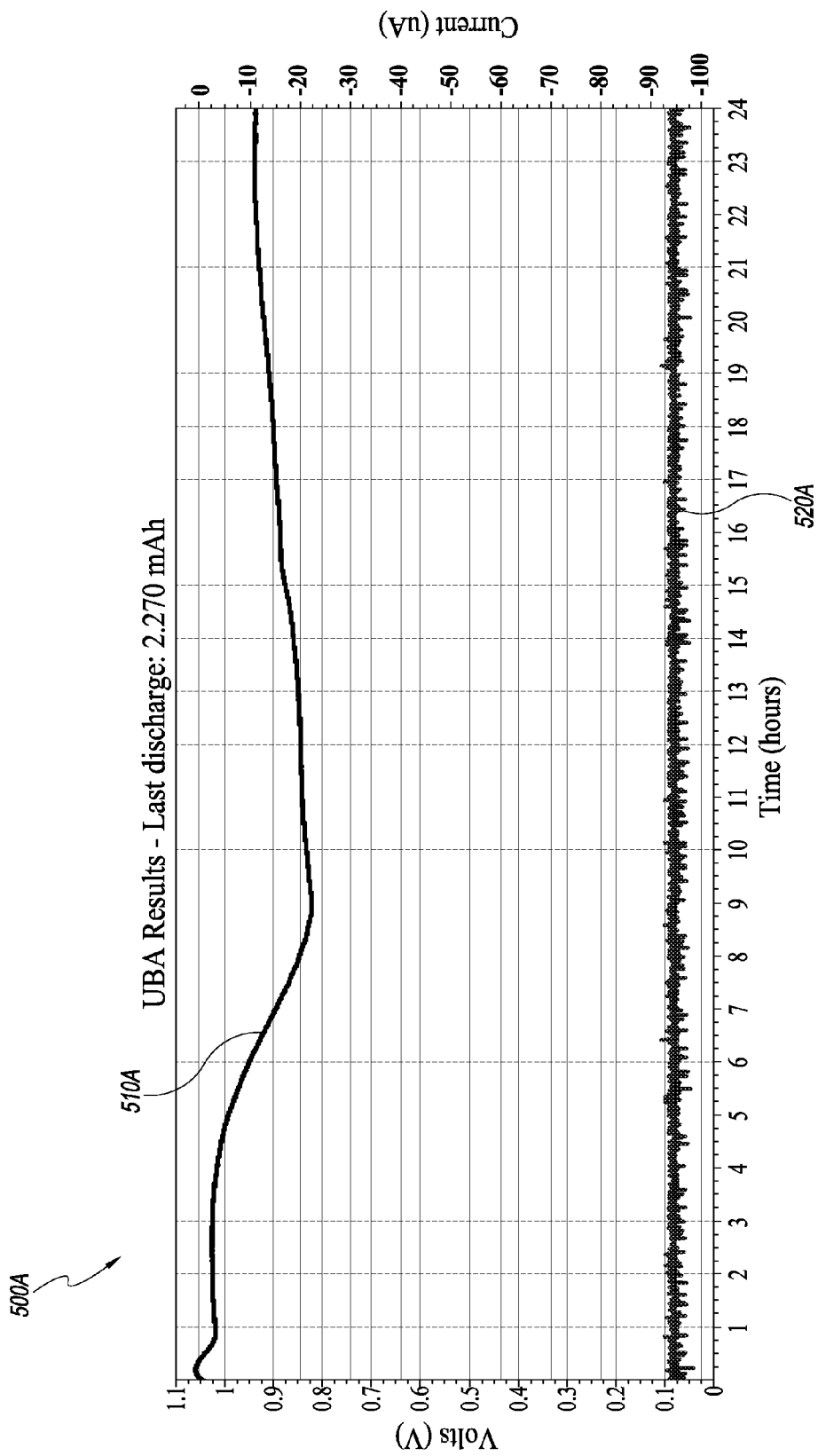
FIGS. 5A and 5B are graphs of battery potential versus time of discharge of an example of an energy storage device, according to another embodiment.
Figure 5B:
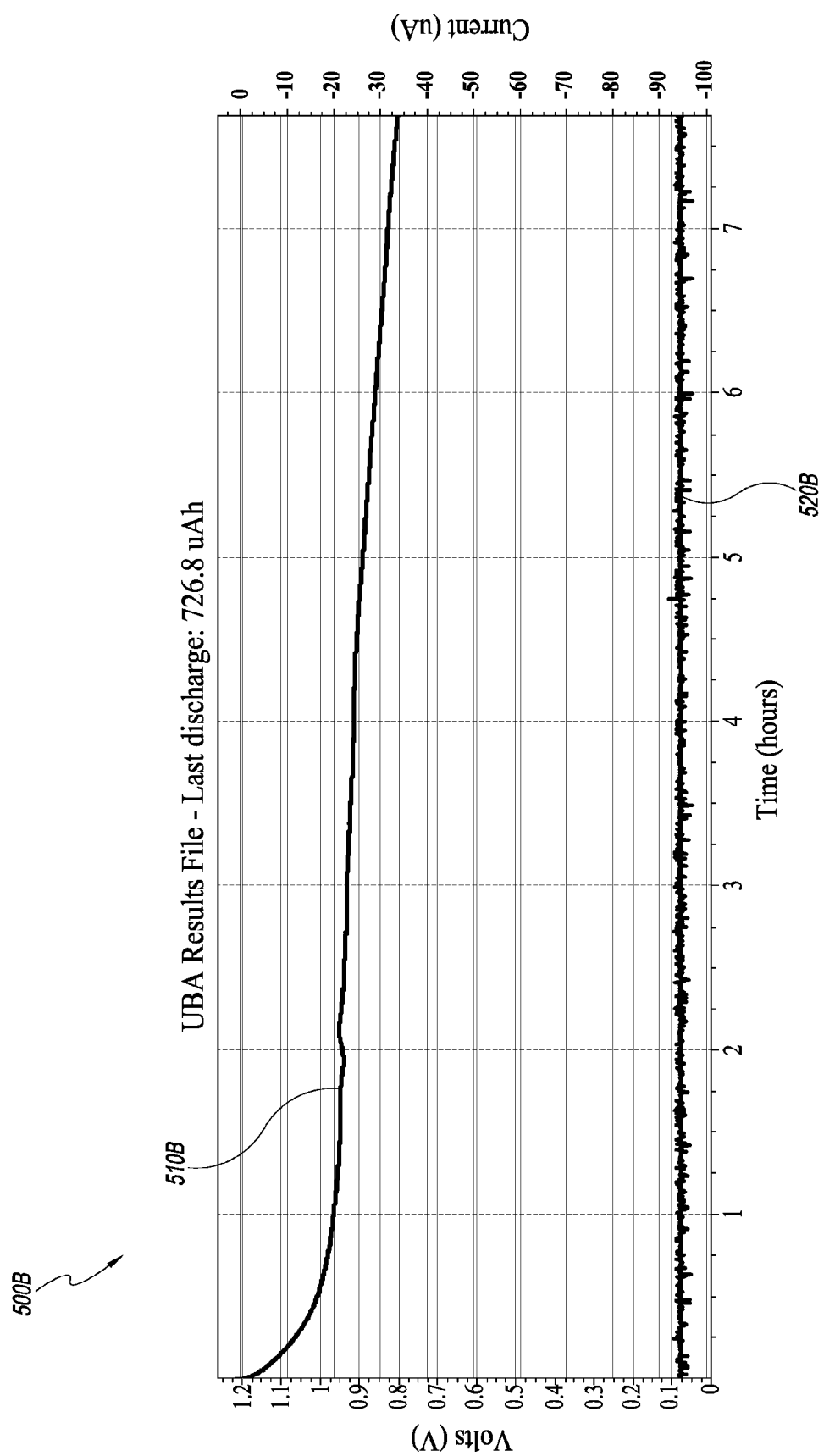

Referring to FIGS. 5A and 5B, graphs 500A and 500B are shown of potential versus discharge time curves 510A and 510B for a partially printed silver oxide battery, demonstrating a potential in V versus time in hours performance of the silver oxide battery discharged at a constant or substantially constant current (as shown by constant current curves 520A, 520B). The silver oxide battery had a shape of a square or substantial of a square, with sides of about 0.5 in by about 0.5 in. The silver oxide battery included an aluminum foil having a thickness of about 50 μm for each of its two current collectors and included a printed silver containing cathode, printed zinc containing anode, and printed separator. The compositions of the inks, in weight %, for printing the cathode, anode, and separator are provided below.

- Silver containing cathode: about 46.9 wt % $Ag_2O$; about 2.5 wt % graphite; about 0.3 wt % polyvinylidene fluoride (PVDF, such as Kynar® HSV grade PVDF); about 50.3 wt % tetramethyl urea.
- Zinc containing anode: about 82.4 wt % Zn dust; about 0.3 wt % 1-ethyl-3-methylimidazolium methanesulfonate; about 2.7 wt % polyvinyl alcohol (PVA, such as PVA having a molecular weight (MW) of about 6000 Daltons (Da)); about 15.0 wt % n-methylpyrrolidone.
- Separator: about 14 wt % 1-ethyl-3-methylimidazolium methanesulfonate; about 14 wt % polyvinylidene fluoride (PVDF, such as Kynar® 2801 grade PVDF); about 72 wt % triethyl phosphate.

The inks were printed by screen printing processes using a size 110 mesh, and each of the printed ink layers were dried at a temperature of about 120° C. for about 7 minutes (e.g., to facilitate evaporation of one or more solvents from the inks after the inks were printed). Each of the printed layers had a thickness of about 15 μm.

As shown in FIGS. 5A and 5B, the silver oxide battery was discharged at a constant or substantially constant current of about −95 μA, for example shown by constant current curves 520A and 520B. The discharge of the silver oxide battery was performed in two steps, first for a duration of about 24 hours (FIG. 5A) and subsequently until the silver oxide battery reached a cut-off voltage of 0.8 V (FIG. 5B). In the first step, the cut-off voltage was set to 0.8 V, but that voltage was not reached before the measuring equipment timed out at 24 hours. The measuring equipment was diligently reset with the same cut-off voltage of 0.8 V, which was reached after about 8 hours in the second step. Between the first step and the second step, when no current was drawn from the battery, the voltage increased from about 0.95 V to about 1.2 V. The silver oxide battery demonstrated an initial voltage of about 1.33 V, an average operating voltage of about 0.9 V, and an average resistance of about 4 kΩ. The total measured capacity was about 3 mAh (2.270 mAh plus 0.7268 mAh). The silver-oxide battery corresponding to FIGS. 5A and 5B demonstrated a 23% higher capacity (3 mAh) value than the silver-oxide battery corresponding to FIG. 3 (2.447 mAh) and a 40% higher capacity (3 mAh) value than the silver-oxide battery corresponding to FIG. 2 (2.149 mAh).

Printing of one or more components of the energy storage device may include various techniques. In some embodiments, printing can include screen printing, inkjet printing, electro-optical printing, electroink printing, photoresist and other resist printing, thermal printing, laser jet printing, magnetic printing, pad printing, flexographic printing, hybrid offset lithography, Gravure and other intaglio printing, die slot deposition, combinations thereof, and/or the like. In some embodiments, printing can include one or more techniques for coating, rolling, spraying, layering, spin coating, lamination, affixing processes, combinations thereof, and/or the like.

Printing of one or more components of the energy storage device can include depositing an ink, for example onto a substrate or another printed layer, using one or more processes described herein. The printed ink may be subsequently dried (e.g., cured) at an elevated temperature (e.g., a temperature higher than room temperature, such as about 25° C.). For example, the printed ink can be dried at one or more temperatures from about 40° C. to about 300° C., including about 40° C. to about 200° C., about 40° C. to about 150° C. In some embodiments, a process for drying printed ink can facilitate evaporation of one or more solvents of the printed ink, smoothing of the printed ink, increased adhesion of the printed ink to the surface upon which the ink was printed, and/or facilitating one or more desired chemical reactions.

In some embodiments, a surface treatment process, such as a plasma treatment process, can be applied to a printed layer. The plasma treatment process may modify one or more characteristics of the treated surface (e.g., increasing adhesion, wettability, and/or ionic conductivity). For example, the plasma treatment process may be applied to the printed ink layer subsequent to performing a process for drying the printed ink. In some embodiments, a plasma treatment can be applied to a surface of the substrate upon which layers of the energy storage device are printed. In some embodiments, a plasma treatment process can be applied to each surface upon which ink for the energy storage device is printed, including for example a surface of the substrate and a surface of each printed layer upon which a subsequent layer is printed.

Plasma treatment processes for treating one or more surfaces in the fabrication process of an energy storage device can be clean, for example generating few or no contaminants (e.g., no electrode and/or sample sputtering). Plasma treatment processes may be efficient, facilitating a high throughput energy storage device manufacturing process, while providing a process of surface treatment with reduced surface damage. Plasma treatment processes may be readily integrated into a process for fabricating a printed energy storage device, such as incorporation with a roll-to-roll process.

Plasma treatment processes may advantageously facilitate cleaning of a substrate surface. For example, plasma treatment processes may remove from the surface of the substrate upon which an energy storage device is printed one or more contaminants used in one or more processes for manufacturing the substrate (e.g., machine lubricating oil), and/or one or more native oxide films and/or other undesired surface layers (e.g., one or more contaminant layers). In some embodiments, one or more plasma treatment processes can facilitate removal from a surface of an aluminum foil substrate a manufacturing tool lubricating oil used in fabrication of the aluminum foil and/or the removal of a native oxide layer from the surface of the aluminum foil substrate. A cleaned substrate surface may improve substrate surface wettability by an ink layer subsequently printed onto the substrate surface, and/or adhesion of the subsequently printed ink layer to substrate surface. As described herein, in some embodiments, a substrate surface upon which a layer of an energy storage is printed can comprise polymers (e.g., a surface of a polymeric substrate). Without being limited by any particular theory or mode of operation, plasma treatment processes may create chemical bonds in polymer molecules, creating chemically reactive molecules on polymeric surfaces, and facilitating adhesion to an adjacent layer through formation of chemical bonding between molecules at the interface with the adjacent layer.

As described herein, in some embodiments, one or more plasma treatment processes can be applied to each layer of the energy storage device. For example, one or more plasma processes may be applied to each printed ink layer of the energy storage device. Treating the printed ink layer with a plasma treatment may improve wettability of another layer placed over the treated layer. For example, a surface of a layer of the energy storage device comprising polymers may have a low surface energy and may be treated by a plasma treatment process (e.g., a surface of a separator, and/or an electrode, upon which a subsequent layer of the energy storage device can be printed). In some embodiments, a plasma treatment process applied to the surface can facilitate effective and/or efficient increase in surface energy, facilitating, for example, improved wettability of the treated layer by the next printing ink. Improved adhesion and/or wettability of printed energy storage device layers may facilitate improved electrical and/or increased lifetime performances of the energy storage device. Plasma treatment of every consequent layer before printing the next layer promotes strong adhesion within the energy storage devices by opening chemical bonding of polymer molecules and making the outermost molecules chemically reactive, which can improve performance and life of the energy storage devices. The plasma treatment can also or alternatively modify a surface by using versatile gas chemistry.

In some embodiments, one or more plasma treatment processes can facilitate improved ionic conductivity and/or electron conductivity across the treated surface. For example, one or more plasma treatment processes applied to a surface of a printed layer for an electrode and/or separator of the energy storage device may facilitate improved ionic transport across the surface, increasing ionic conductivity of the surface (e.g., facilitating ionic transport between adjacent layers of the device). One or more plasma treatment processes applied to a surface of a printed layer for a current collector and/or electrode of the energy storage device may facilitate improved electron conductivity across the surface between the current collector and electrode (e.g., facilitating increased current collection by the current collector). Improved ionic conductivity and/or electron conductivity across a surface of the electrode and/or separator may facilitate reduced energy storage device resistance, increased energy storage device operating voltage, and/or increased energy storage device capacity.

A tool for application of one or more plasma treatment processes described herein can be commercially available (e.g., commercially available from Surfx® Technologies LLC, of Redondo Beach, Calif., USA). For example, Surfx® Atomflo™ plasma system can be equipped with a two-inch wide linear beam plasma source, and can be operated under atmospheric pressure and room temperature (e.g., at a temperature of about 25° C.). Application of plasma treatment processes at room temperature may facilitate treatment of surfaces comprising materials (e.g., surfaces of solid and/or semisolid materials) having low melting temperatures (e.g., melting temperatures of greater than about 30° C.). One example of suitable operating conditions for a Surfx® Atomflo™ plasma system can include operation using 200 Watts (W) of radio frequency power, 30 liters/min (L/min) of industrial grade helium and 0.9 L/min ultrahigh purity oxygen, with a 5 mm source to substrate distance, and a 10 millimeters per second (mm/s) scan speed. Plasma chemistry can be tailored to the desired application by the reactive gas feed (e.g., oxygen—activation, cleaning, sterilization; nitrogen—activation, cleaning; hydrogen—oxide removal, activation; and/or carbon tetrafluoride—glass and metal etching). In some embodiments, an oxygen gas based plasma treatment can facilitate providing effective surface modification.

One or more parameters of the plasma treatment process may be adjusted to facilitate desired surface modification (e.g., selection of process gas, duration of treatment process, and/or distance from the plasma source). For example, one or more parameters of the plasma treatment process may be selected for the surface modification of each printed ink layer and/or substrate. Plasma treatment process parameters may be selected to optimize interlayer adhesion and/or surface wettability.

EXAMPLE EMBODIMENTS

The following example embodiments identify some possible permutations of combinations of features disclosed herein, although other permutations of combinations of features are also possible.

1. An energy storage device comprising:
a silver-containing cathode; and
an electrolyte comprising an ionic liquid having an anion selected from the group consisting of: methanesulfonate, methylsulfate, acetate, and fluoroacetate.

2. The energy storage device of embodiment 1, wherein the silver-containing cathode comprises at least one of silver(I) oxide ($Ag_2O$), silver(I,III) oxide (AgO), manganese (IV) oxide ($MnO_2$), nickel oxyhydroxide (NiOOH), and silver nickel oxide ($AgNiO_2$).

3. The energy storage device of embodiment 1 or 2, further comprising an anode.

4. The energy storage device of embodiment 3, wherein the anode comprises at least one of zinc, cadmium, iron, nickel, aluminum, metal hydrate, and hydrogen.

5. The energy storage device of embodiment 3 or 4, wherein at least one of the cathode and the anode are printed.

6. The energy storage device of any one of embodiments 3 to 5, wherein at least one of the anode and the cathode comprises a conductive additive.

7. The energy storage device of embodiment 6, wherein the conductive additive comprises at least one of a conductive carbon and a metal.

8. The energy storage device of embodiment 7, wherein the conductive carbon comprises at least one of graphite, graphene, and carbon nanotubes.

9. The energy storage device of any one of embodiments 3 to 8, wherein at least one of the cathode and anode comprises a polymer binder.

10. The energy storage device of embodiment 9, wherein the polymer binder comprises at least one of polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycolhexafluoropropylene, polyethylene terephthalate, polyacrylonitrile, polyvinyl butyral, polyvinylcaprolactam, polyvinyl chloride; polyimide polymers and copolymers (including aliphatic, aromatic and semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organomodified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, and chitosan.

11. The energy storage device of any one of embodiments 3 to 10, further comprising a separator between the anode and the cathode.

12. The energy storage device of embodiment 11, wherein the separator comprise the electrolyte.

13. The energy storage device of embodiment 11 or 12, wherein the separator is printed.

14. The energy storage device of embodiment 13, wherein the printed separator comprises dissolved cellulose.

15. The energy storage device of embodiment 14, wherein the dissolved cellulose comprises dissolved cellulose from at least one of lignin, cotton, rayon, regenerated cellulose, α-cellulose, wood, xylan, lyocell, and bagasse.

16. The energy storage device of embodiment 11 or 12, wherein the separator is non-printed.

17. The energy storage device of embodiment 16, wherein the non-printed separator comprises at least partially dissolved cellulose.

18. The energy storage device of embodiment 16 or 17, wherein the non-printed separator comprises at least one of borosilicate glass, asbestos, potassium titanate fibers, and zirconium oxide.

19. The energy storage device of any one of embodiments 16 to 18, wherein the non-printed separator comprises at least one of polyamide, polyolefin, and fibrous sausage casing.

20. The energy storage device of any one of embodiments 3 to 19, further comprising at least one current collector.

21. The energy storage device of embodiment 20, wherein the at least one current collector is directly adjacent to and in contact with the cathode or the anode.

22. The energy storage device of embodiment 20 or 21, wherein the at least one current collector comprises a metallic foil.

23. The energy storage device of any one of embodiments 20 to 22, wherein a substrate upon which the energy storage device is fabricated comprises the at least one current collector.

24. The energy storage device of embodiment 20 or 21, wherein the at least one current collector is a printed current collector.

25. The energy storage device of any one of embodiments 20 to 24, wherein at least one of the cathode, anode, at least one current collector, and separator comprises a surface treated by a surface modification process.

26. The energy storage device of any one of embodiments 20 to 24, wherein each of the cathode, anode, at least one current collector, and separator comprise a surface treated by a surface modification process.

27. The energy storage device of embodiment 25 or 26, further comprising a substrate including a surface treated by the surface modification process.

28. The energy storage device of any one of embodiments 25 to 27, wherein the surface modification process comprises a plasma treatment process.

29. The energy storage device of any one of embodiments 1 to 28, wherein the ionic liquid is a basic ionic liquid.

30. The energy storage device of any one of embodiments 1 to 29, wherein the ionic liquid comprises a cation selected from the group consisting of: imidazolium, pyridinium, ammonium, piperidinium, pyrrolidinium, sulfonium, and phosphonium.

31. The energy storage device of embodiment 30, wherein the cation comprises at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

32. The energy storage device of any one of embodiments 1 to 31, wherein the electrolyte further comprises an additive configured to improve ionic conductivity.

33. The energy storage device of embodiment 32, wherein the additive comprises an organic solvent.

34. The energy storage device of embodiment 33, wherein the organic solvent comprises at least one of ethers, esters, alkyl carbonates, and nitriles.

35. The energy storage device of any one of embodiments 32 to 34, wherein the additive comprises a salt.

36. The energy storage device of embodiment 35, wherein the salt comprises a cation selected from: lithium, zinc, cadmium, nickel, aluminum, silver, cobalt.

37. The energy storage device of embodiment 35 or 36, wherein the salt comprises an anion selected from: tris(pentafluoroethyl)trifluorophosphate, trifluoromethanesulfonate, hexafluorophosphate, tetrafluoroborate, ethyl sulfate, dimethyl phosphate, trifluoromethanesulfonate, methanesulfonate, triflate, tricyanomethanide, dibutylphosphate, bis(trifluoromethylsulfonyl)imide, bis-2,4,4-(trimethylpentyl) phosphinate, iodide, chloride, bromide, nitrate, methanesulfonate, methylsulfate, acetate, and fluoroacetate.

38. An ink for an electrode of an energy storage device, the ink comprising:
   an ionic liquid comprising an anion selected from the group consisting of: methanesulfonate, methylsulfate, acetate, and fluoroacetate;
   an electrode active component; and
   a solvent.

39. The ink of embodiment 38, wherein the electrode active component comprises at least one of silver(I) oxide ($Ag_2O$), a silver(I,III) oxide (AgO), manganese(IV) oxide ($MnO_2$), nickel oxyhydroxide (NiOOH), and silver nickel oxide ($AgNiO_2$).

40. The ink of embodiment 38, wherein the electrode active component comprises at least one of zinc, cadmium, iron, nickel, aluminum, metal hydrate, and hydrogen.

41. The ink of embodiment 38, wherein the electrode active component comprises zinc.

42. The ink of any one of embodiments 38 to 41, wherein the ionic liquid is a basic ionic liquid.

43. The ink of any one of embodiments 38 to 42, wherein the ionic liquid comprises a cation selected from the group consisting of: imidazolium, pyridinium, ammonium, piperidinium, pyrrolidinium, sulfonium, and phosphonium.

44. The ink of embodiment 43, wherein the cation comprises at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

45. The ink of any one of embodiments 38 to 44, wherein the solvent comprises at least one of water, alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; lactones such as butyl lactone; ethers such as methyl ethyl ether, diethyl ether, ethyl propyl ether, and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, n-butyl acetate, dimethyl adipate, proplyene glycol monomethyl ether acetate, dimethyl glutarate, dimethyl succinate, glycerin acetate, carboxylates; carbonates such as propylene carbonate; polyols (or liquid polyols), glycerols and other polymeric polyols or glycols such as glycerin, diol, triol, tetraol, pentaol, ethylene glycols, diethylene glycols, polyethylene glycols, propylene glycols, dipropylene glycols, glycol ethers, glycol ether acetates 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol; tetramethyl urea, n-methylpyrrolidone, acetonitrile, tetrahydrofuran (THF), dimethyl formamide (DMF), N-methyl formamide (NMF), dimethyl sulfoxide (DMSO); thionyl chloride; sulfuryl chloride; cyclohexanone, dimethyl acetamide, dimethyl sulfoxide, triethyl phosphate, and isophorone.

46. The ink of any one of embodiments 38 to 45, further comprising a polymer binder.

47. The ink of embodiment 46, wherein the polymer binder comprises at least one of a polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycolhexafluoropropylene, polyethylene terephthalate, polyacrylonitrile, polyvinyl butyral, polyvinylcaprolactam, polyvinyl chloride; polyimide polymers and copolymers (including aliphatic, aromatic and semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organo-modified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, and chitosan.

48. The ink of any one of embodiments 38 to 47, further comprising a conductive additive.

49. The ink of embodiment 48, wherein the conductive additive comprises at least one of a conductive carbon and a metal.

50. An ink for a separator of an energy storage device, the ink comprising:
   an electrolyte comprising an ionic liquid having an anion selected from the group consisting of: methanesulfonate, methylsulfate, acetate, and fluoroacetate; and
   dissolved cellulose.

51. The ink of embodiment 50, wherein the ionic liquid further comprises a cation selected from the group consisting of imidazolium, pyridinium, ammonium, piperidinium, pyrrolidinium, sulfonium, and phosphonium.

52. The ink of embodiment 51, wherein the cation comprises at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

53. The ink of any one of embodiments 50 to 52, wherein the ionic liquid is a basic ionic liquid.

54. The ink of any one of embodiments 50 to 53, wherein the dissolved cellulose comprises dissolved cellulose from at least one of lignin, cotton, rayon, regenerated cellulose, α-cellulose, wood, xylan, lyocell, and bagasse.

55. The ink of any one of embodiments 50 to 54, further comprising an organic solvent.

56. The ink of embodiment 55, wherein the organic solvent comprises a polar aprotic organic solvent.

57. The ink of embodiment 56, wherein the polar aprotic organic solvent comprise at least one of triethanolamine, ethylenediamine, pentylamine, N-Methylmorpholine N-oxide, dimethylacetamide, dimethylsulfoxide, and tetrabutylammonium fluoride trihydrate.

58. The ink of any one of embodiments 50 to 57, wherein the dissolved cellulose comprises cellulose which was subjected to a pretreatment process.

59. The ink of embodiment 58, wherein the pretreatment process comprises at least one of mechanical milling of the cellulose, applying microwave radiation to the cellulose, and applying ultrasonic radiation to the cellulose.

60. An electrode of an energy storage device, the electrode comprising:
an electrolyte comprising an ionic liquid having an anion selected from the group consisting of: methanesulfonate, methylsulfate, acetate, and fluoroacetate; and
an electrode active component.

61. The electrode of embodiment 60 wherein the electrode is a cathode of the energy storage device, and wherein the electrode active component of the cathode comprises a silver-containing component.

62. The electrode of embodiment 61, wherein the silver containing component comprises at least one of silver(I) oxide ($Ag_2O$), silver(I,III) oxide (AgO), manganese(IV) oxide ($MnO_2$), nickel oxyhydroxide (NiOOH), and silver nickel oxide ($AgNiO_2$).

63. The electrode of embodiment 60, wherein the electrode is an anode of the energy storage device, and wherein the energy storage device comprises a silver oxide battery.

64. The electrode of embodiment 63, wherein the electrode active component of the anode comprises at least one of zinc, cadmium, iron, nickel, aluminum, metal hydrate, and hydrogen.

65. The electrode of embodiment 63, wherein the electrode active component of the anode comprises zinc.

66. The electrode of any one of embodiments 60 to 65, wherein the ionic liquid is a basic ionic liquid.

67. The electrode of any one of embodiments 60 to 66, wherein the ionic liquid comprises a cation selected from the group consisting of: imidazolium, pyridinium, ammonium, piperidinium, pyrrolidinium, sulfonium, and phosphonium.

68. The electrode of embodiment 67, wherein the cation comprises at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

69. The electrode of any one of embodiments 60 to 68, further comprising a polymer binder.

70. The electrode of embodiment 69, wherein the polymer binder comprises at least one of a polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycolhexafluoropropylene, polyethylene terephthalate, polyacrylonitrile, polyvinyl butyral, polyvinylcaprolactam, polyvinyl chloride; polyimide polymers and copolymers (including aliphatic, aromatic and semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organomodified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, and chitosan.

71. The electrode of any one of embodiments 60 to 70 further comprising a conductive additive.

72. The electrode of embodiment 71, wherein the conductive additive comprises at least one of a conductive carbon and a metal.

73. The electrode of any one of embodiments 60 to 72, wherein the energy storage device comprises at least one of a primary silver oxide battery and a secondary silver oxide battery.

74. A separator for an energy storage device, the separator comprising:
a membrane comprising at least at least partially dissolved cellulose; and
an electrolyte comprising an ionic liquid having an anion selected from the group consisting of: methanesulfonate, methylsulfate, acetate, and fluoroacetate.

75. The separator of embodiment 74, wherein the energy storage device comprises a silver oxide battery.

76. The separator of embodiment 74 or 75, wherein the ionic liquid further comprises a cation selected from the group consisting of imidazolium, pyridinium, ammonium, piperidinium, pyrrolidinium, sulfonium, and phosphonium.

77. The separator of embodiment 76, wherein the cation comprises at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

78. The separator of any one of embodiments 74 to 77, wherein the ionic liquid is a basic ionic liquid.

79. The separator of any one of embodiments 74 to 78, wherein the separator is a non-printed separator.

80. The separator of embodiment 79, wherein the non-printed separator comprises at least partially dissolved regenerated cellulose.

81. The separator of any one of embodiments 74 to 78, wherein the separator is a printed separator.

82. The separator of embodiment 81, wherein the at least partially dissolved cellulose is fully dissolved.

83. The separator of embodiment 82, wherein the fully dissolved cellulose comprises dissolved cellulose from at least one of lignin, cotton, rayon, regenerated cellulose, α-cellulose, wood, xylan, lyocell, and bagasse.

84. The separator of embodiment 82 or 83, wherein the fully dissolved cellulose comprises cellulose which was subjected to a pretreatment process.

85. The separator of embodiment 84, wherein the pretreatment process comprises at least one of mechanical milling of the cellulose, applying microwave radiation to the cellulose, and applying ultrasonic radiation to the cellulose.

86. The separator of any one of embodiments 74 to 85, wherein the energy storage device comprises a cathode comprising at least one of silver(I) oxide ($Ag_2O$), silver(I, III) oxide (AgO), manganese(IV) oxide ($MnO_2$), nickel oxyhydroxide (NiOOH), and silver nickel oxide ($AgNiO_2$).

87. The separator of any one of embodiments 74 to 86, wherein the energy storage device comprises an anode comprising at least one of zinc, cadmium, iron, nickel, aluminum, metal hydrate, and hydrogen.

88. A process for treating a surface of an energy storage device during fabrication of the energy storage device, the process comprising:
 applying a plasma treatment process to the surface, wherein the plasma treatment process is configured to increase at least one of a wettability of, adhesion of, electron conductivity across, and ionic conductivity across the surface; and
 applying a subsequent layer of the energy storage device onto the treated surface.

89. The process of embodiment 88, wherein applying the subsequent layer of the energy storage device comprises printing the subsequent layer of the energy storage device onto the treated surface.

90. The process of embodiment 88 or 89, wherein applying the plasma treatment process comprises directing a plasma source at the surface of the energy storage device at a temperature of about 25° C. and under atmospheric pressure.

91. The process of any one of embodiments 88 to 90, further comprising selecting at least one parameter of the plasma treatment process based on a type of the surface being treated and/or a type of surface modification being performed.

92. The process of any one of embodiments 88 to 91, wherein applying the plasma treatment process comprises applying an oxygen gas containing plasma to the surface of the energy storage device.

93. The process of any one of embodiments 88 to 92, wherein applying the plasma treatment process comprises applying a plasma comprising at least one of a nitrogen gas, hydrogen gas and carbon tetrafluoride gas, to the surface of the energy storage device.

94. The process of any one of embodiments 88 to 93, wherein the energy storage device comprises a current collector, and wherein applying the plasma treatment process comprises applying the plasma treatment process to a surface of the current collector of the energy storage device.

95. The process of any one of embodiments 88 to 94, wherein the energy storage device comprises an electrode, and wherein applying the plasma treatment process comprises applying the plasma treatment process to a surface of the electrode of the energy storage device.

96. The process of any one of embodiments 88 to 95, wherein the energy storage device comprises a separator, and wherein applying the plasma treatment process comprises applying the plasma treatment process to a surface of the separator of the energy storage device.

97. The process of embodiment 94 or 95, wherein the plasma treatment process is configured to increase an electron conductivity across the treated surface.

98. The process of embodiment 95 or 96, wherein the plasma treatment process is configured to increase an ionic conductivity across the treated surface.

99. The process of embodiment 88 to 98, further comprising applying a plasma treatment process to a surface a substrate upon which the energy storage device is fabricated.

100. The process of any one of embodiments 88 to 99, wherein the energy storage device comprises a battery.

101. The process of embodiment 100, wherein the battery comprises at least one of a primary silver oxide battery and a second silver oxide battery.

102. A method of manufacturing an energy storage device, the method comprising:
 printing an electrode of the energy storage device, wherein the electrode comprises an ionic liquid comprising an anion selected from the group consisting of: methanesulfonate, methylsulfate, acetate, and fluoroacetate.

103. The method of embodiment 102, wherein the ionic liquid is a basic ionic liquid.

104. The method of embodiment 102 or 103, wherein the ionic liquid further comprises a cation selected from the group consisting of: imidazolium, pyridinium, ammonium, piperidinium, pyrrolidinium, sulfonium, and phosphonium.

105. The method of embodiment 104, wherein the cation comprises at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl (tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

106. The method of any one of embodiments 102 to 105, wherein the energy storage device comprises a silver oxide battery.

107. The method of embodiment 106, wherein the electrode is a cathode of the energy storage device.

108. The method of embodiment 107, wherein the electrode further comprises at least one of silver(I) oxide ($Ag_2O$), silver(I,III) oxide (AgO), manganese(IV) oxide ($MnO_2$), nickel oxyhydroxide (NiOOH), and silver nickel oxide ($AgNiO_2$).

109. The method of embodiment 106, wherein the electrode is an anode of the energy storage device.

110. The method of embodiment 109, wherein the electrode comprises at least one of zinc, cadmium, iron, nickel, aluminum, metal hydrate, and hydrogen.

111. The method of any one of embodiments 102 to 110, wherein the electrode comprises at least one of a polymer binder, a conductive additive, and a solvent.

112. The method of any one of embodiments 102 to 111, further comprising providing a separator.

113. The method of embodiment 112, wherein providing the separator comprises printing the separator.

114. The method of embodiment 113, wherein printing the separator comprises dissolving a cellulose material.

115. The method of embodiment 114, wherein dissolving the cellulose material comprises immersing the cellulose material in a soaking chemistry comprising an ionic liquid.

116. The method of embodiment 115, wherein the ionic liquid comprises an anion selected from the group consisting of: chloride, acetate, methanesulfonate, bromide, and formate.

117. The method of any one of embodiments 114 to 116, further comprising pretreating the cellulose material by applying at least one of mechanical milling, ultrasonic radiation, and microwave radiation, to the cellulose material.

118. The method of any one of embodiments 114 to 117, further comprising adding a polar aprotic organic solvent to the dissolved cellulose material.

119. The method of embodiment 118, wherein the polar aprotic organic solvent comprises at least one of triethanolamine, ethylenediamine, pentylamine, N-Methylmorpholine N-oxide, dimethylacetamide, dimethylsulfoxide, and tetrabutylammonium fluoride trihydrate.

120. The method of embodiment 112, wherein providing the separator comprises inserting the separator between the electrode and a second electrode of the energy storage device.

121. The method of embodiment 120, wherein inserting the separator comprises partially dissolving a cellulose material.

122. The method of embodiment 121, wherein partially dissolving the cellulose material comprises partially dissolving a regenerated cellulose material.

123. The method of embodiment 121 or 122, wherein partially dissolving the cellulose material comprises immersing the cellulose material in a soaking chemistry comprising an ionic liquid.

124. The method of embodiment 123, wherein the ionic liquid comprises an anion selected from the group consisting of: chloride, acetate, methanesulfonate, bromide, and formate.

125. The method of any one of embodiments 102 to 124, further comprising adding an electrolyte to the energy storage device.

126. The method of embodiment 125, wherein the electrolyte comprises the ionic liquid.

127. The method of embodiment 125 or 126, wherein the electrolyte further comprises a conductive additive.

128. The method of embodiment 127, wherein the conductive additive comprises at least one of an organic solvent and a salt.

129. The method of any one of embodiments 102 to 128, further comprising coupling a current collector to the electrode.

130. The method of embodiment 129, wherein coupling the current collector comprises coupling a conductive foil to the electrode.

131. The method of embodiment 130, wherein coupling the current collector comprises printing the electrode over the current collector.

132. The method of any one of embodiments 102 to 131, further comprising applying a plasma treatment process to a surface of at least one of the electrode, separator, and current collector of the energy storage device.

133. The method of embodiment 132, further comprising applying a plasma treatment process to a surface of each of the electrode, separator, and current collector of the energy storage device.

134. The method of embodiment 132 or 133, wherein the plasma treatment process is configured to improve at least one of an adhesion of, wettability of, electron conductivity across, and ionic conductivity across the treated surface.

135. The method of any one of embodiments 132 to 134, wherein applying the plasma treatment process comprises applying a plasma comprising at least one of an oxygen, hydrogen, nitrogen and carbon tetrafluoride gas.

136. The method of any one of embodiments 114 to 119 and 121 to 135, wherein dissolving the cellulose material or partially dissolving the cellulose material comprises placing the cellulose material in a mixture comprising a first ionic liquid having a first ionic conductivity and a first dissolution effect upon the cellulose material, and a second ionic liquid having a second ionic conductivity greater than the first ionic conductivity and a second dissolution effect upon the cellulose material.

137. The method of embodiment 136, wherein the second dissolution effect is less than the first dissolution effect.

138. The method of any one of embodiments 114 to 119 and 121 to 135, wherein dissolving the cellulose material or partially dissolving the cellulose material comprises placing the cellulose material in a mixture comprising a first ionic liquid having a first ionic conductivity and a first dissolution effect upon the cellulose material, and a second ionic liquid having a second ionic conductivity and a second dissolution effect upon the cellulose material less than the first dissolution effect.

139. The method of embodiment 138, wherein the second ionic conductivity is greater than the first ionic conductivity.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. An energy storage device comprising:
   a silver-containing cathode;
   an anode;
   a separator between the anode and the cathode; and
   an electrolyte comprising an ionic liquid having an anion selected from the group consisting of: methanesulfonate, methylsulfate, acetate, and fluoroacetate,
   wherein the separator comprises at least partially dissolved cellulose.

2. The device of claim 1, wherein the silver-containing cathode comprises at least one of silver(I) oxide ($Ag_2O$), silver(I,III) oxide (AgO), and silver nickel oxide ($AgNiO_2$), or wherein the silver-containing cathode further comprises at least one of manganese(IV) oxide ($MnO_2$), and nickel oxyhydroxide (NiOOH).

3. The device of claim 1, wherein the anode comprises zinc.

4. The device of claim 1, wherein the ionic liquid comprises a cation selected from the group consisting of: imidazolium, pyridinium, ammonium, piperidinium, pyrrolidinium, sulfonium, and phosphonium.

5. The device of claim 4, wherein the cation comprises at least one of a butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2, 3-methylimidazolium, 1-butyl-1-methylpiperidinium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium.

6. The device of claim 1, wherein the electrolyte further comprises an additive configured to improve ionic conductivity.

7. The device of claim 6, wherein the additive comprises an organic solvent.

8. The device of claim 7, wherein the organic solvent comprises at least one of ethers, esters, alkyl carbonates, and nitriles.

9. The device of claim 1, wherein the at least partially dissolved cellulose comprises at least partially dissolved regenerated cellulose.

10. The device of claim 1, wherein the dissolved cellulose comprises dissolved cellulose from at least one of lignin, cotton, rayon, regenerated cellulose, α-cellulose, wood, xylan, lyocell, and bagasse.

11. The device of claim 1, wherein at least one of the anode and the cathode comprises a conductive additive.

12. The device of claim 11, wherein the conductive additive comprises at least one of a conductive carbon and a metal.

13. The device of claim 12, wherein the conductive carbon comprises at least one of graphite, graphene, and carbon nanotubes.

14. The device of claim 1, wherein at least one of the cathode and anode comprises a polymer binder.

15. The device of claim 1, wherein the separator comprises the electrolyte.

16. The device of claim 1, wherein at least one of the cathode, the anode, and the separator comprises a surface treated by a surface modification process.

17. The device of claim 1, wherein the ionic liquid is a basic ionic liquid.

18. The device of claim 1, wherein the electrolyte further comprises an additive configured to improve ionic conductivity, wherein the additive comprises an organic solvent.

19. The device of claim 1, wherein the electrolyte further comprises an additive configured to improve ionic conductivity, wherein the additive comprises a salt.

20. The device of claim 1, wherein at least one of the silver-containing cathode and anode is printed.

* * * * *

UNITED STATES PATENT AND TRADEMARK OFFICE
CERTIFICATE OF CORRECTION

PATENT NO. : 9,786,926 B2  
APPLICATION NO. : 14/332802  
DATED : October 10, 2017  
INVENTOR(S) : Vera N. Lockett It is certified that error appears in the above-identified patent and that said Letters Patent is hereby corrected as shown below:

On the Title Page  
    ff  
    Item (71), (Applicant) at Lines 1-2, Change "Tempe, AZ (US)" to --Brisbane, Queensland (AU)--.

In Column 2 (page 2, item (56)) at Line 12, Under Other Publications, change "dimentional" to --dimensional--.

In Column 2 (page 2, item (56)) at Line 25, Under Other Publications, change "nanostrcutured" to --nanostructured--.

In Column 2 (page 2, item (56)) at Line 26, Under Other Publications, change "micro-asseblies" to --micro-assemblies--.

In Column 2 (page 2, item (56)) at Line 63, Under Other Publications, change "Enviromental" to --Environmental--.

In Column 1 (page 3, item (56)) at Line 7, Under Other Publications, change "Flourine-Doped" to --Fluorine-Doped--.

In Column 1 (page 3, item (56)) at Line 14, Under Other Publications, change ""Diatomeceous," to --"Diatomaceous,--.

In Column 1 (page 3, item (56)) at Line 18, Under Other Publications, change "micromashinning:" to --micromachining:--.

In Column 1 (page 3, item (56)) at Line 20, Under Other Publications, change "Biolofical" to --Biological--.

In Column 2 (page 3, item (56)) at Line 2, Under Other Publications, change "poltungstate" to --polytungstate--.

Signed and Sealed this  
Twelfth Day of June, 2018

Andrei Iancu  
*Director of the United States Patent and Trademark Office*

CERTIFICATE OF CORRECTION (continued)
U.S. Pat. No. 9,786,926 B2

In Column 2 (page 3, item (56)) at Line 5, Under Other Publications, change ""Ultasonic" to --"Ultrasonic--.

In Column 2 (page 3, item (56)) at Line 12, Under Other Publications, change "for" to --of--.

In Column 2 (page 3, item (56)) at Line 29, Under Other Publications, change "dimentional" to --dimensional--.

In Column 2 (page 3, item (56)) at Lines 50-51, Under Other Publications, change "alkaline/acide" to --alkaline/acid--.

In the Specification

In Column 1 at Lines 61-62, Change "polyvynylidene" to --polyvinylidene--.

In Column 1 at Line 63, Change "polyethelene," to --polyethylene,--.

In Column 3 at Line 63, Change "proplyene" to --propylene--.

In Column 4 at Line 1, Change "pentaol," to --pentanol,--.

In Column 4 at Line 17, Change "polyvynylidene" to --polyvinylidene--.

In Column 4 at Line 19, Change "polyethelene," to --polyethylene,--.

In Column 5 at Line 52, Change "polyvynylidene" to --polyvinylidene--.

In Column 5 at Line 54, Change "polyethelene," to --polyethylene,--.

In Column 13 at Line 56, Change "propylimidzolium" to --propylimidazolium--.

In Column 14 at Line 63, Change "methansulfonate" to --methanesulfonate--.

In Column 17 at Line 63, Change "polyvynylidene" to --polyvinylidene--.

In Column 17 at Line 65, Change "polyethelene," to --polyethylene,--.

In Column 18 at Line 53, Change "proplyene" to --propylene--.

In Column 18 at Line 57, Change "pentaol," to --pentanol,--.

In Column 23 at Line 27, Change "vA," to --μA,--.

In Column 31 at Line 14 (approx.), Change "polyvynylidene" to --polyvinylidene--.

In Column 31 at Line 15 (approx.), Change "polyethelene," to --polyethylene,--.

In Column 33 at Line 54, Change "proplyene" to --propylene--.

In Column 33 at Line 58, Change "pentaol," to --pentanol,--.

In Column 34 at Line 10 (approx.), Change "polyvynylidene" to --polyvinylidene--.

In Column 34 at Line 11 (approx.), Change "polyethelene," to --polyethylene,--.

In Column 35 at Line 62, Change "polyvynylidene" to --polyvinylidene--.

In Column 35 at Line 63, Change "polyethelene," to --polyethylene,--.

In the Claims

In Column 41 at Line 5, In Claim 5, change "1-ethyl-2, 3-methylimidazolium," to --1-ethyl-2,3 methylimidazolium,--.